US008606603B2

(12) United States Patent
Annappindi

(10) Patent No.: US 8,606,603 B2
(45) Date of Patent: Dec. 10, 2013

(54) UNEMPLOYMENT RISK SCORE AND PRIVATE INSURANCE FOR EMPLOYEES

(75) Inventor: Suresh Annappindi, Bear, DE (US)

(73) Assignee: Scorelogix LLC, Bear, DE (US)

( * ) Notice: Subject to any disclaimer, the term of this patent is extended or adjusted under 35 U.S.C. 154(b) by 2236 days.

(21) Appl. No.: 10/729,444

(22) Filed: Dec. 5, 2003

(65) Prior Publication Data

US 2005/0125259 A1    Jun. 9, 2005

(51) Int. Cl.
G06Q 50/00 (2012.01)
G06Q 10/00 (2012.01)

(52) U.S. Cl.
USPC .................................. 705/4; 705/35

(58) Field of Classification Search
USPC ............................................. 705/4
See application file for complete search history.

(56) References Cited

U.S. PATENT DOCUMENTS

| 4,774,664 | A | 9/1988 | Campbell et al. |
| 5,696,907 | A | 12/1997 | Tom |
| 5,712,984 | A | 1/1998 | Hammond et al. |
| 5,991,743 | A | 11/1999 | Irving et al. |
| 6,182,048 | B1 | 1/2001 | Osborn et al. |
| 6,185,543 | B1 | 2/2001 | Galperin et al. |
| 6,332,125 | B1 * | 12/2001 | Callen et al. ............ 705/4 |
| 6,513,018 | B1 | 1/2003 | Culhane |
| 6,542,894 | B1 | 4/2003 | Lee et al. |
| 6,597,775 | B2 | 7/2003 | Lawyer et al. |
| 2003/0037063 | A1 | 2/2003 | Schwartz |
| 2004/0153330 | A1 | 8/2004 | Miller et al. |

OTHER PUBLICATIONS

Booth, Job Tenure and Job Mobility in Britain, Industrial and Labor Relations Review, vol. 53, No. 1 (Oct. 1999), pp. 43-70.*
Guiso, An Empirical Analysis of Earnings and Employment Risk, 2002 American Statistical Association Journal of Business & Economic Statistics, Apr. 2002, vol. 20, No. 2.*
Karni, Optimal Unemployment Insurance: A Survey, Southern Economic Journal, vol. 66, No. 2 (Oct. 1999), pp. 442-465, Stable URL: http://www.jstor.org/stable/1061155.*
Wenger, J., et al., EPI Issue Brief, Coming Up Short Current Unemployment Insurance Benefits Fail to Meet Basic Family Needs, Oct. 31, 2001, pp. 1-6.
Schwab, S., "Predicting the Future of Employment Law: Reflecting or Refracting Market Forces?", Indiana Law Journal, vol. 76:29, pp. 29-48.

* cited by examiner

Primary Examiner — Tran Nguyen
(74) Attorney, Agent, or Firm — Blank Rome LLP

(57) ABSTRACT

Systems and methods for scoring unemployment risk and predicting unemployment probability and for optionally providing unemployment insurance to employees. The unemployment insurance is provided through a private insurer under which the unemployment insurance policy coverage and benefits terms are selected, and policy premiums paid for, by employees. The unemployment insurance benefits are paid to employees when they face involuntary unemployment. The present invention results in the calculation of unemployment risk scores and a method of rendering private unemployment insurance to employees in the form of a primary or a supplementary unemployment insurance, or both.

23 Claims, 22 Drawing Sheets

PRIVATE UNEMPLOYMENT INSURANCE: BLOCK DIAGRAM

PRIVATE UNEMPLOYMENT INSURANCE: DETAILED MODEL

PRIVATE UNEMPLOYMENT INSURANCE: DETAILED MODEL

UNEMPLOYMENT SCORE & RISK-BASED PRICING BLOCK DIAGRAM

UNEMPLOYMENT RISK SCORE DETERMINATION

RISK BASED POLICY PRICING & PREMIUM DETERMINATION

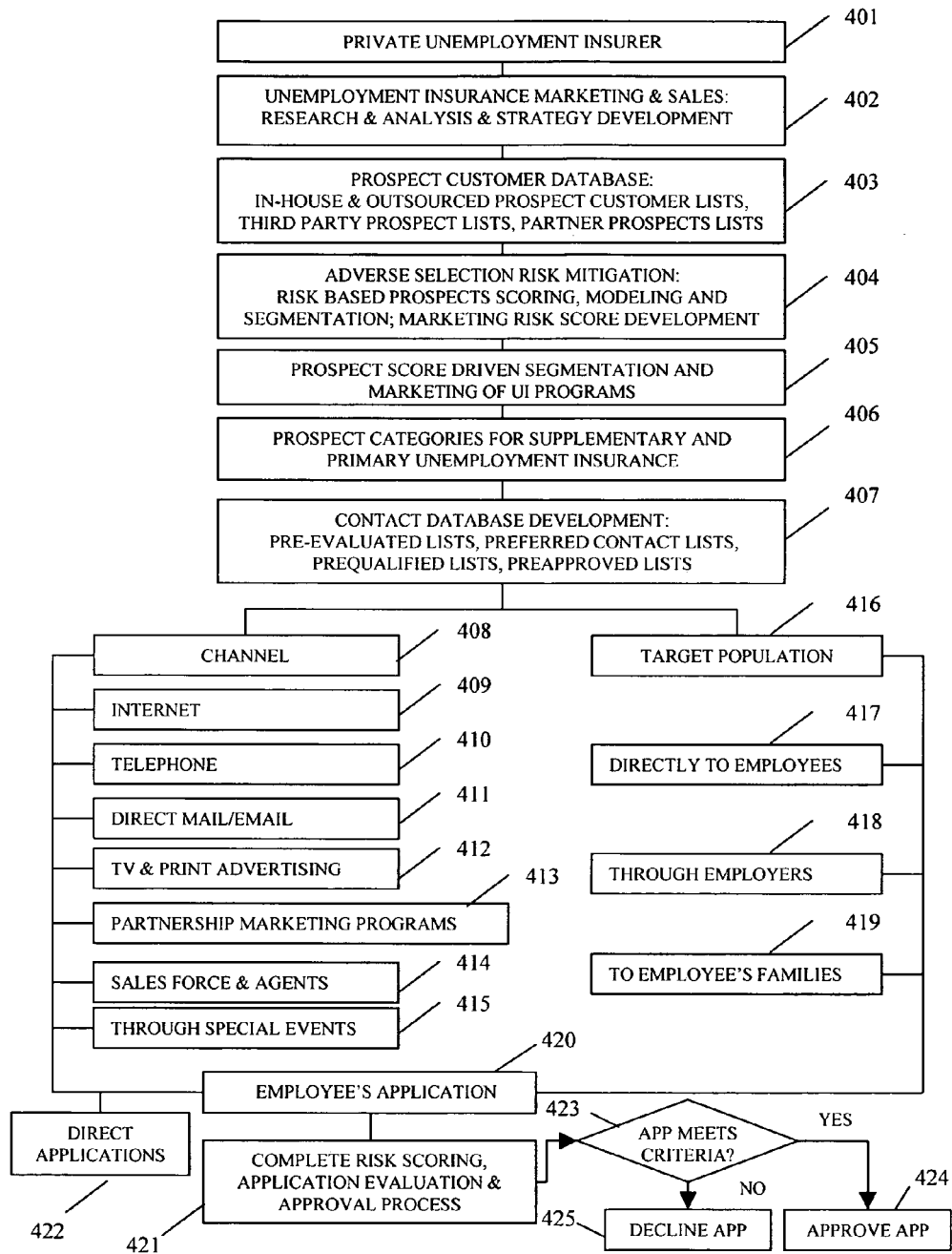

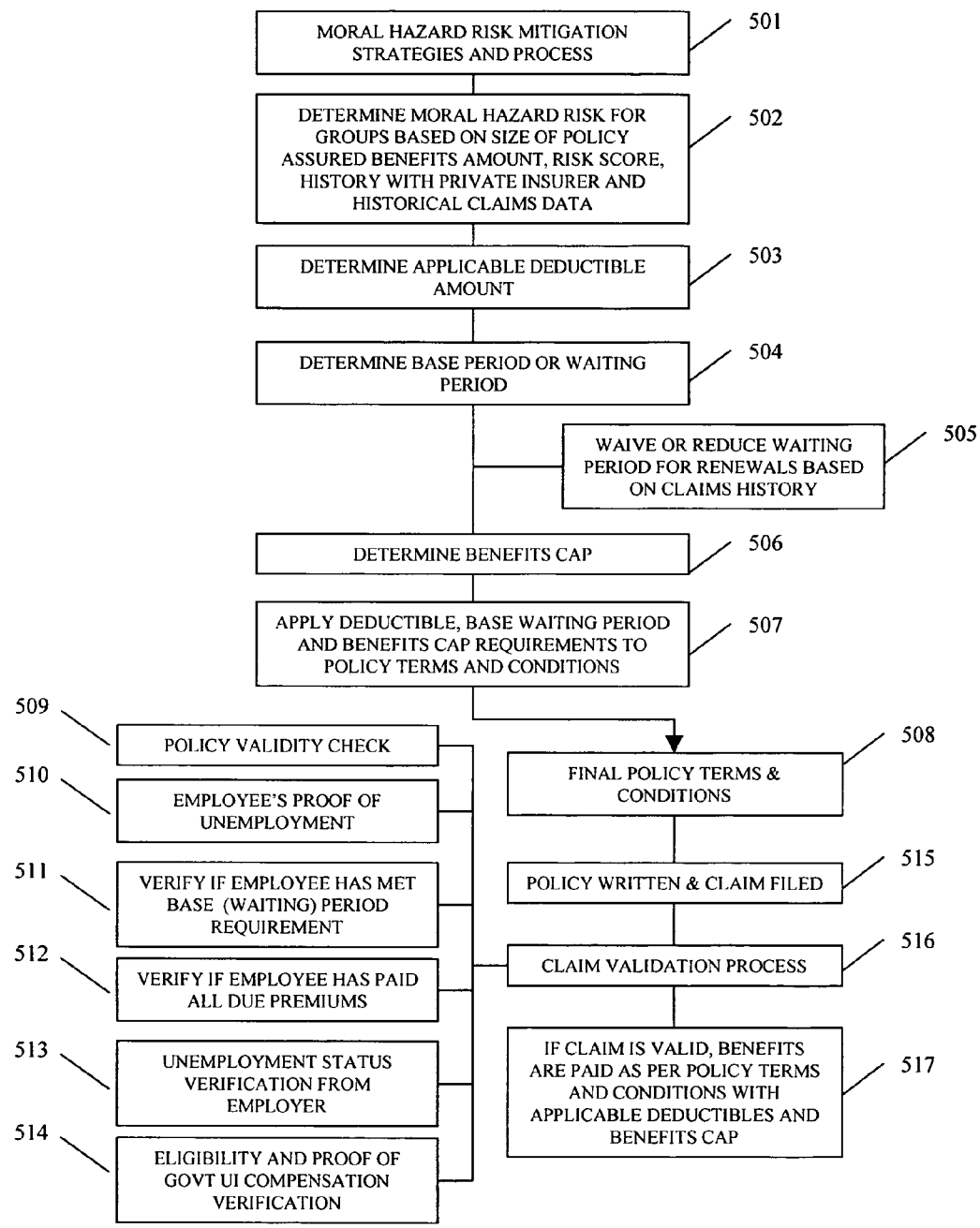

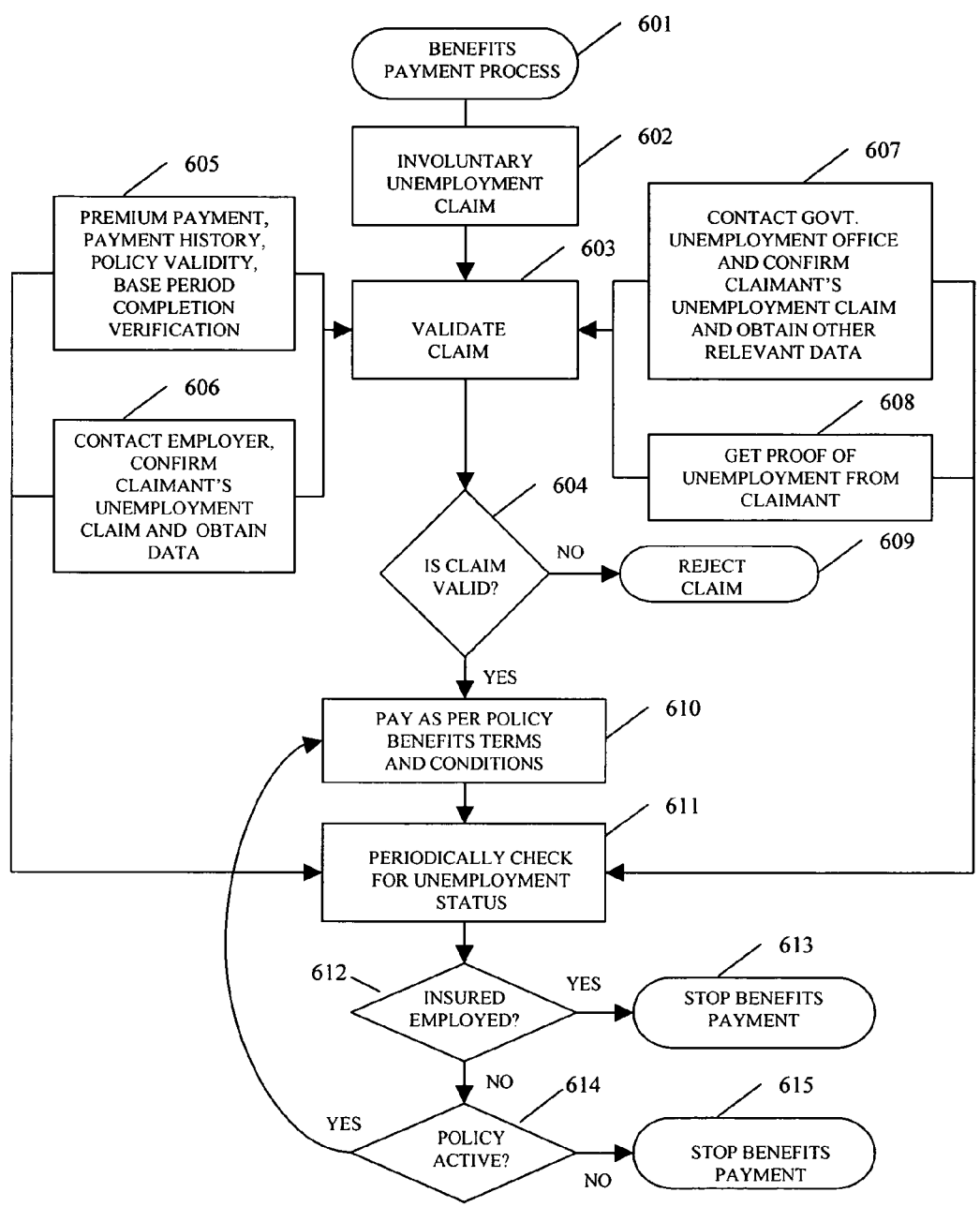

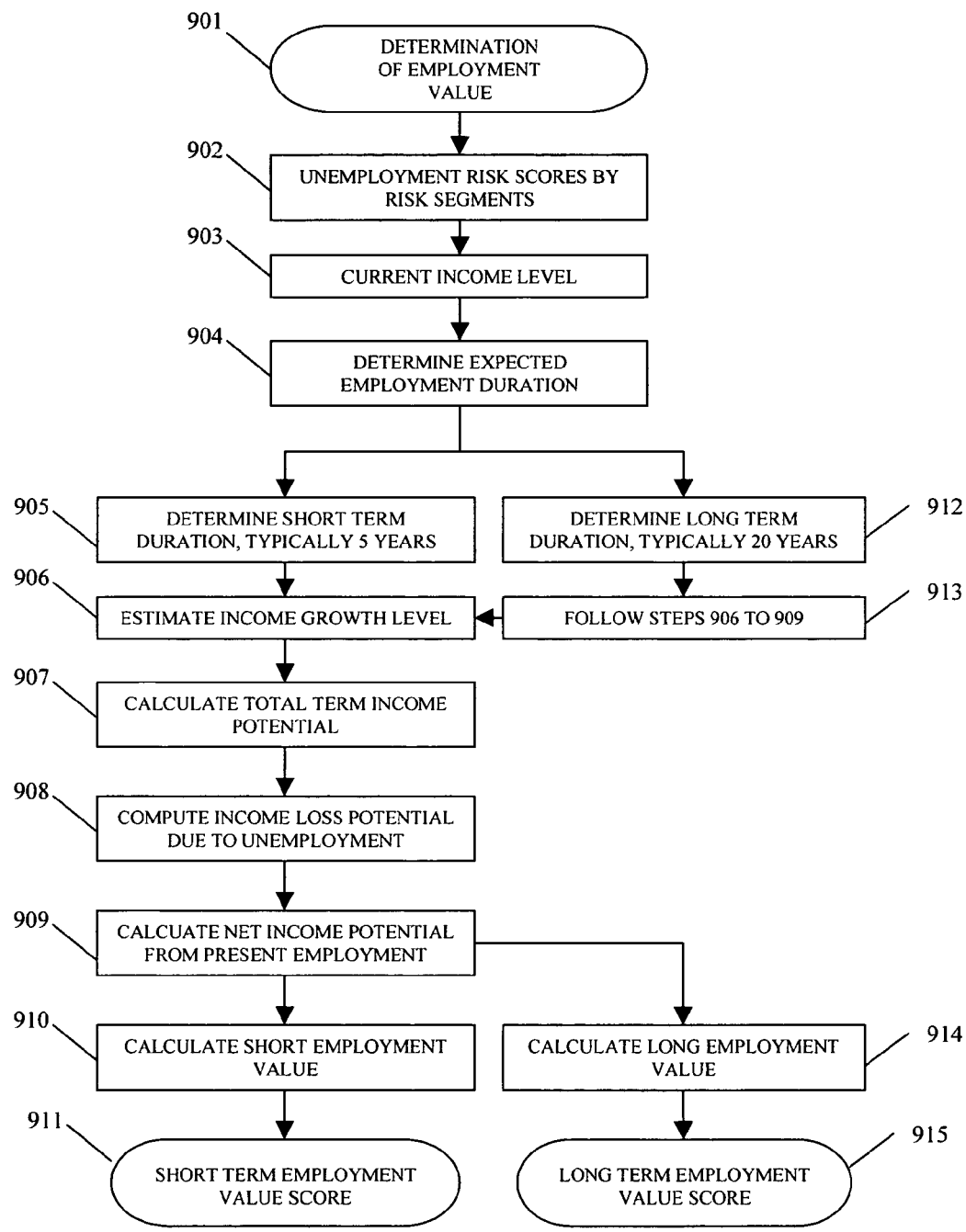

UNEMPLOYMENT INSURANCE RISK-CLASS VARIABLES

Figure 9

Unemployment Risk Class Categories & Variables*

| Age** | State |
|---|---|
| Total, 16 years | GEORGIA |
| Total 16 to 24 years. | GUAM |
| Total 16 to 19 years. | HAWAII |
| Total 16 to 17 years. | IDAHO |
| Total 18 to 19 years. | ILLINOIS |
| Total 20 to 24 years. | INDIANA |
| Total 25 years and ov | IOWA |
| Total 25 to 54 years. | KANSAS |
| Total 55 years and ov | KENTUCKY |
| Occupation | LOUISIANA |
| Managerial and professional specialty | MAINE |
| Technical, sales, and administrative support | MARSHALL ISLANDS |
| Precision production, craft, and repair | MARYLAND |
| Operators, fabricators, and laborers | MASSACHUSETTS |
| Farming, forestry, and fishing | MICHIGAN |
| Other Occupation | MINNESOTA |
| Race and Age  | MISSISSIPPI |
| White men 20+ | MISSOURI |
| White women 20+ | MONTANA |
| Black men 20+ | NEBRASKA |
| Black women 20+ | NEVADA |
| Hispanics | NEW HAMPSHIRE |
| Other Race | NEW JERSEY |
| Education | NEW MEXICO |
| Less than a high school diploma | NEW YORK |
| High school graduates, no college(2) | NORTH CAROLINA |
| Less than a bachelor's degree(3) | NORTH DAKOTA |
| College graduates | NORTHERN MARIANA ISLANDS |
| Industry | OHIO |
| Occupation | OKLAHOMA |
| Construction | OREGON |
| Manufacturing | PALAU |
| Wholesale and retail trade | PENNSYLVANIA |
| Transportation and utilities | PUERTO RICO |
| Information | RHODE ISLAND |
| Financial activities | SOUTH CAROLINA |
| Professional and business services | SOUTH DAKOTA |
| Education and health services | TENNESSEE |
| Leisure and hospitality | TEXAS |
| Agriculture and related private wage and salary workers | UTAH |
| Government workers | VERMONT |
| Other Industry | VIRGIN ISLANDS |
| Gender & Age | VIRGINIA |
| Men 16 to 24 years. | WASHINGTON |
| Men 16 to 17 years. | WEST VIRGINIA |
| Men 18 to 19 years. | WISCONSIN |
| Men 20 to 24 years. | WYOMING |
| Men 25 years and ov | Region |
| Men 25 to 54 years. | Northeast |
| Men 55 years and ov | South |
| Women 16 to 24 years. | Midwest |
| Women 16 to 17 years. | West |
| Women 18 to 19 years. | Subregion |
| Women 20 to 24 years. | New England |
| Women 25 years and ov | Middle Atlantic |
| Women 25 to 54 years. | South Atlantic |
| Women 55 years and ov | East South Central |
| State | West South Central |
| ALABAMA | East North Central |
| ALASKA | West North Central |
| AMERICAN SAMOA | Mountain |
| ARIZONA | Pacific |
| ARKANSAS | |
| CALIFORNIA | |
| COLORADO | |
| CONNECTICUT | |
| DELAWARE | |
| DISTRICT OF COLUMBIA | |
| FEDERATED STATES OF MICRONESIA | |
| FLORIDA | |

\* These model variables for risk class determination are indicative of a preferred embodiment of this invention.
\*\* Used only if legally permitted

UNEMPLOYMENT RATE FORECAST VARIABLES

Figure 10

Unemployment Rate Forecast Variables

| | |
|---|---|
| CPI (Consumer price index) | Light vehicle sales |
| PPI (Producer price index) | Personal Income |
| GDP | Total consumer credit |
| Prime interest rate | Revolving credit |
| US Trade balance | Corporate profits |
| Retail sales | Consumer expenditure |
| 30 Year Mortgage Rate | Personal savings rate |
| Housing Starts | Industry capacity utilization |
| Gold Prices | National industrial vacancy rates |
| Oil Prices | Govt spending |
| Industrial Prod. Index | S&L spending |
| M1 Money Supply | Corporate capital spending |
| Yen to US Dollar | Corporate debt |
| S&P 500 | Personal Disposal Income |
| Labor force growth | Consumer confidence |

UNEMPLOYMENT RISK CATEGORIES & RISK FACTORS

Figure 11

Unemployment Risk Categories

Selected Unemployment Categories

| Category 1 | Occupation |
| Category 2 | Education |
| Category 3 | Industry |
| Category 4 | Age & Sex |
| Category 5 | Region |

These 5 categories are selected because they are the most logical reasons for unemployment and their correlation with historical unemployment rates is found to be the highest.
Using similar methodology, as shown in this invention, it is easily possible to substitute, include or exclude other categories, such as state, county, metropolitan area, cities, race, marital status, home ownership, etc., as per the business considerations and legal requirements.

Unemployment Rate by Category Variables

| Occupation | UE rate* | Education | UE rate | Industry | UE Rate | Age & Sex | UE rate | Region | UE rate |
|---|---|---|---|---|---|---|---|---|---|
| Managerial | 3.1% | Below hi school | 9.2% | Mining | 5.4% | M; 16-24 | 12.7% | Northeast | 5.3% |
| Sales Service | 5.2% | High school | 5.2% | Construction | 8.5% | M;25+ | 5.1% | New Eng | 4.5% |
| Skilled | 6.4% | Below bachelor's | 4.7% | Manufacturing | 6.3% | F; 16-24 | 11.6% | Mid Atl | 5.6% |
| Semi-skilled | 8.8% | College | 2.9% | Wholesale Retail | 6.2% | F;25+ | 4.4% | South | 5.2% |
| Farming | 7.4% | | | Trnsprt Utilities | 4.2% | | | S Atl | 4.9% |
| Other | 6.0% | | | Information | 6.6% | | | E S Central | 5.1% |
| | | | | Financial | 3.7% | | | W S Central | 5.7% |
| | | | | Prof svcs | 8.2% | | | Midwest | 4.9% |
| | | | | Edu Hlth svcs | 2.8% | | | E N Central | 5.4% |
| | | | | Leisure and hosp | 8.9% | | | W N Central | 4.0% |
| | | | | Agri | 11.1% | | | West | 6.1% |
| | | | | Govt | 2.3% | | | Mountain | 5.2% |
| | | | | Other | 6.0% | | | Pacific | 6.4% |

US National Average for Unemployment Rate    6.00%

Unemployment Risk Factors by Category Variables

| Occupation | Risk Factor | Education | Risk Factor | Industry | Risk Factor | Age & Sex | Risk Factor | Region | Risk Factor |
|---|---|---|---|---|---|---|---|---|---|
| Managerial | 0.52 | Below hi school | 1.53 | Mining | 0.90 | M; 16-24 | 2.12 | Northeast | 0.88 |
| Sales Service | 0.87 | High school | 0.87 | Construction | 1.42 | M;25+ | 0.85 | New Eng | 0.75 |
| Skilled | 1.07 | Below bachelor's | 0.78 | Manufacturing | 1.05 | F; 16-24 | 1.93 | Mid Atl | 0.93 |
| Semi-skilled | 1.47 | College | 0.48 | Wholesale Retail | 1.03 | F;25+ | 0.73 | South | 0.87 |
| Farming | 1.23 | | | Trnsprt Utilities | 0.70 | | | S Atl | 0.82 |
| Other | 1.00 | | | Information | 1.10 | | | E S Central | 0.85 |
| | | | | Financial | 0.62 | | | W S Central | 0.95 |
| | | | | Prof svcs | 1.37 | | | Midwest | 0.82 |
| | | | | Edu Hlth svcs | 0.47 | | | E N Central | 0.90 |
| | | | | Leisure and hosp | 1.48 | | | W N Central | 0.67 |
| | | | | Agri | 1.85 | | | West | 1.02 |
| | | | | Govt | 0.38 | | | Mountain | 0.87 |
| | | | | Other | 1.00 | | | Pacific | 1.07 |

US National Average for Unemployment Risk Factors    1.00

Note:   All data used here is for indicative purposes only and may not be factual.
        UE Rate = Unemployment Rate (%)
        Unemployment Risk Factor values are computed by dividing risk variable's individual UE Rate with National UE rate.

UNEMPLOYMENT FORECAST FOR INDIVIDUAL RISK CLASSES
Figure 12

Unemployment Risk & Rate Estimation by Homogenous Risk Classes

4 CLASS VARIABLES AND RISK FACTORS

| Occupation | Risk Factor | Education | Risk Factor | Industry | Risk Factor | Region | Risk Factor |
|---|---|---|---|---|---|---|---|
| Managerial | 0.52 | Below hi school | 1.53 | Mining | 0.90 | Northeast | 0.88 |
| Sales Service | 0.87 | High school | 0.87 | Construction | 1.42 | New Eng | 0.75 |
| Skilled | 1.07 | Below bachelor's | 0.78 | Manufacturing | 1.05 | Mid Atl | 0.93 |
| Semi-skilled | 1.47 | College | 0.48 | Wholesale Retail | 1.03 | South | 0.87 |
| Farming | 1.23 | | | Trnsprt Utilities | 0.70 | S Atl | 0.82 |
| Other | 1.00 | | | Information | 1.10 | E S Central | 0.85 |
| | | | | Financial | 0.62 | W S Central | 0.95 |
| | | | | Prof svcs | 1.37 | Midwest | 0.82 |
| | | | | Edu Hlth svcs | 0.47 | E N Central | 0.90 |
| | | | | Leisure and hosp | 1.48 | W N Central | 0.67 |
| | | | | Agri | 1.85 | West | 1.02 |
| | | | | Govt | 0.38 | Mountain | 0.87 |
| | | | | Other | 1.00 | Pacific | 1.07 |

VARIABLES PER CATEGORY

| OCCUPATION | 6 | EDUCATION | 4 | INDUSTRY | 13 | REGION | 13 |
|---|---|---|---|---|---|---|---|

| | | |
|---|---|---|
| Total number of classes | 4,056 | Total US labor force is divided into 4,056 homogenous groups where each class consists of 35,750 workers who share similar attributes and form a homogenous group. |
| Total US labor force | 145,000,000 | |
| Avg class size | 35,750 | |

RISK FACTORS BY CLASS VARIABLES FOR EACH CATEGORY
Each homogenous unemployment insurance class is selected by choosing one applicable variable from each category.
For example, all workers over 25 years with high school education in a semi-skilled job in the construction industry in Midwest would form one class. So, unemployment risk factors for this specific class would be as follows:

Unemployment Forecast by selected Risk Classes

Risk factors for variables for example 1

| Semi-skilled | 1.47 | High school | 0.87 | Construction | 1.42 | Midwest | 0.82 |
|---|---|---|---|---|---|---|---|

Class Example 1:
| | |
|---|---|
| Class categories | (OCCUPATION) (EDUCATION) (INDUSTRY) (REGION) |
| Class selection | (Semi-skilled) (High school) (Construction) (Midwest) |
| Selected Class Risk Factor | 1.47 |
| Selected Class UR | 8.80% |

Class Example 2:
| | |
|---|---|
| | (OCCUPATION) (EDUCATION) (INDUSTRY) (REGION) |
| Class selection | (Managerial) (College) (Financial) (Northeast) |
| Selected Class Risk Factor | 0.88 |
| Selected Class UR | 5.30% |

Class Example 3:
| | |
|---|---|
| | (OCCUPATION) (EDUCATION) (INDUSTRY) (REGION) |
| Class selection | (Farming) (Below hi school) (Agri) (Pacific) |
| Selected Class Risk Factor | 1.85 |
| Selected Class UR | 11.10% |

As can be seen from above examples, unemployment risk and unemployment rate estimates can be calculated for all 35,750 groups. Essentially, each worker in the labor force would belong to one of these 35,750 classes for which this invention allows a risk factor to be forecasted which in turn forecasts unemployment rate.

Note: All data used here is for indicative purposes only and may not be factual.

UNEMPLOYMENT FORECAST FOR INDIVIDUAL RISK CLASSES
Figure 13

Unemployment Risk & Rate Estimation by Homogenous Risk Classes

5 CLASS CATEGORIES & ITS VARIABLES

| Occupation | Risk Factor | Education | Risk Factor | Industry | Risk Factor | Age & Sex | Risk Factor | Region | Risk Factor |
|---|---|---|---|---|---|---|---|---|---|
| Managerial | 0.52 | Below hi school | 1.53 | Mining | 0.90 | M; 16-24 | 2.12 | Northeast | 0.88 |
| Sales Service | 0.87 | High school | 0.87 | Construction | 1.42 | M;25+ | 0.85 | New Eng | 0.75 |
| Skilled | 1.07 | Below bachelor's | 0.78 | Manufacturing | 1.05 | F; 16-24 | 1.93 | Mid Atl | 0.93 |
| Semi-skilled | 1.47 | College | 0.48 | Wholesale Retail | 1.03 | F;25+ | 0.73 | South | 0.87 |
| Farming | 1.23 | | | Tnsprt Utilities | 0.70 | | | S Atl | 0.82 |
| Other | 1.00 | | | Information | 1.10 | | | E S Central | 0.85 |
| | | | | Financial | 0.62 | | | W S Central | 0.95 |
| | | | | Prof svcs | 1.37 | | | Midwest | 0.82 |
| | | | | Edu Hlth svcs | 0.47 | | | E N Central | 0.90 |
| | | | | Leisure and hosp | 1.48 | | | W N Central | 0.67 |
| | | | | Agri | 1.85 | | | West | 1.02 |
| | | | | Govt | 0.38 | | | Mountain | 0.87 |
| | | | | Other | 1.00 | | | Pacific | 1.07 |

VARIABLES PER CATEGORY

| OCCUPATION | 6 | EDUCATION | 4 | INDUSTRY | 13 | AGE & SEX | 4 | REGION | 13 |
|---|---|---|---|---|---|---|---|---|---|

Total number of classes 16,224
Total US labor force 145,000,000
Avg class size 8,937

Total US labor force is divided into 16,224 homogenous groups where each class consists of 8,937 workers who share similar attributes and form a homogenous group.

RISK FACTORS BY CLASS VARIABLES FOR EACH CATEGORY
Each homogenous unemployment insurance class is selected by choosing one applicable variable from each category.
For example, all workers over 25 years with high school education in a semi-skilled job in the construction industry in Midwest would form one class. So, unemployment risk factors for this specific class would be as follows:

Class Example 1: Risk classes and its associated risk factor

| Semi-skilled | 1.47 | High school | 0.87 | Construction | 1.42 | M;25+ | 0.85 | Midwest | 0.82 |
|---|---|---|---|---|---|---|---|---|---|

Class Example 1:
Class categories      (OCCUPATION) (EDUCATION) (INDUSTRY) (AGE & SEX) (REGION)
Class selection       (Semi-skilled) (High school) (Construction) (M;25+) (Midwest)
Selected Class Risk Factor     1.08
Selected Class UR    6.50%

Class Example 2:               (OCCUPATION) (EDUCATION) (INDUSTRY) (AGE & SEX) (REGION)
Class selection       (Managerial) (College) (Financial) (M;25+) (Northeast)
Selected Class Risk Factor     0.67
Selected Class UR    4.02%

Class Example 3:               (OCCUPATION) (EDUCATION) (INDUSTRY) (AGE & SEX) (REGION)
Class selection       (Farming) (Below hi school) (Agri) (M; 16-24) (Pacific)
Selected Class Risk Factor     1.56
Selected Class UR    9.36%

As can be seen from above examples, unemployment risk and unemployment rate estimates can be calculated for all 16,244 groups. Essentially, each worker in the labor force would belong to one of these 16,244 classes for which this invention allows a risk to be assigned and unemployment rate forecast possible. This invention allows the private unemployment insurer to vary the class definition, size and number to achieve a desired optimum class grouping suited to business needs, legal requirements, market opportunity and data availability.

Note: All data used here is for indicative purposes only and may not be factual.

UNEMPLOYMENT FORECAST FOR INDIVIDUAL RISK CLASSES
Figure 14

CLASS RISK FACTOR AND UNEMPLOYMENT RATE

Selection of Unemployment Categories and Variables within each Category

CATEGORY 1 — Occupation
- Managerial
- Sales Service
- Skilled
- Semi-skilled
- Farming (selected)
- Other Category Variable selected: Farming
Variable Risk Factor: 1.23

CATEGORY 2 — Education
- Below hi school (selected)
- High school
- Below bachelor's
- College Category Variable selected: Below hi school
Variable Risk Factor: 1.53

CATEGORY 3 — Industry
- Mining
- Construction
- Manufacturing
- Wholesale Retail
- Trnsprt Utilities
- Information
- Financial
- Prof svcs
- Edu Hlth svcs
- Leisure and hosp
- Agri (selected)
- Govt
- Other Category Variable selected: Agri
Variable Risk Factor: 1.85

CATEGORY 4 — Age & Sex
- M; 16-24 (selected)
- M; 25+
- F; 16-24
- F; 25+

Category Variable selected: M; 16-24
Variable Risk Factor: 2.12

CATEGORY 5 — State
(list of state abbreviations; CA selected)

Category Variable selected: CA
Variable Risk Factor: 0.92

CATEGORY 6 — Region
- Northeast
- New Eng
- Mid Atl
- South
- S Atl
- E S Central
- W S Central
- Midwest
- E N Central
- W N Central
- West
- Mountain
- Pacific (selected)

Category Variable selected: Pacific
Variable Risk Factor: 1.07

| Risk Category | Description | Risk Factor |
|---|---|---|
| CATEGORY 1 | Farming | 1.23 |
| CATEGORY 2 | Below hi school | 1.53 |
| CATEGORY 3 | Agri | 1.85 |
| CATEGORY 4 | M; 16-24 | 2.12 |
| CATEGORY 5 | CA | 0.92 |
| CATEGORY 6 | Pacific | 1.07 |

CALCULATION OF RISK FACTOR FOR UNIQUE RISK CLASS AND UNEMPLOYMENT RATE

CLASS RISK FACTOR $(Crf)x$ $$(Crf)x = f \{[(Rcat1)i], [(Rcat2)j], [(Rcat3)k], [(Rcat4)l], \ldots [(Rcatn)v]\}$$

[Where $\{R(catn)v\}$ is Risk Factor for Risk Variable 'v' belonging to Risk Category 'n']

RISK CLASS RISK FACTOR $(Crf)x =$ $$\left\{ \frac{\sum \{([(Rcat1)i] + [(Rcat2)j] + [(Rcat3)k] + [(Rcat4)l] + [(Rcat5)m] + [(Rcat6)n])\}}{\sum (\text{NUMBER OF CATEGORIES})} \right\}$$

In this example, selected class risk factor is: 1.45

{(RISK CLASS)farming, bel high sch, Agri, M;16-24, CA, Pacific} UR = {(CLASS RISK FACTOR) * (NATIONAL UR)}

We know that national UR is = 6.00%

Therefore, our risk clasS UR is = 8.72%

(Indicates that selected Risk Class will have a 45% higher unemployment risk as compared to national average)

UNEMPLOYMENT RISK SCORES
Figure 15

Unemployment Risk Scores

Based on selected risk classes

All figures are for illustration of a method of computing unemployment risk scores and are not actuals.
Other similar techniques consitute part of this invention.

Unemployment Rate Assumptions:
| | |
|---|---|
| National unemployment rate | 6.0% |
| Maximum unemployment rate among all risk variables | 9.0% |
| Minimum unemployment rate among all risk variables | 3.0% |

*Further assumptions:*
Unemployment rates above 9% would be treated as 9%
Unemployment rates below 3% would be treated as 3%

Conversion scale for converting forecasted unemployment risk factors into unemployment scores

| Risk Class<br>Unemployment rate | Risk Class<br>Unemployment Score |
|---|---|
| 2.0% | 900 |
| 2.5% | 900 |
| 3.0% | 900 |
| 3.5% | 850 |
| 4.0% | 800 |
| 4.5% | 750 |
| 5.0% | 700 |
| 5.5% | 650 |
| 6.0% | 600 |
| 6.5% | 550 |
| 7.0% | 500 |
| 7.5% | 450 |
| 8.0% | 400 |
| 8.5% | 350 |
| 9.0% | 300 |
| 9.5% | 300 |
| 10.0% | 300 |
| 10.5% | 300 |
| 11.0% | 300 |
| 11.5% | 300 |
| 12.0% | 300 |

Note: Higher unemployment score indicates lower unemployment risk.

SHORT TERM & LONG TERM EMPLOYMENT VALUE SCORES
Figure 16

Employment Value Score
*Following is to illustrate the concept and data may not be factual.*

| Employment profile | | | |
|---|---|---|---|
| Risk Item/Data | Employment profile A | Short term employment value (5 years) | Long term employment value (20 years) |
| OCCUPATION | Farming | | |
| EDUCATION | Below hi school | | |
| INDUSTRY | Agri | | |
| AGE & SEX | M; 16-24 | | |
| REGION | Pacific | | |
| Unemployment or employment security score | 300 | | |
| Current income level | $30,000 | | |
|     Expected income growth rate per annum | | 2.00% | 2.20% |
|     Total income potential | | $159,244 | $759,975 |
|     Income risk due to unemployment risk | | $19,675 | $93,896 |
|     Expected years of similar employment | | 5 | 20 |
| Total employment value | | $139,569 | $666,079 |
| Profile A Employment Value Score | | 186 | 222 |

| New employment profile | | | |
|---|---|---|---|
| Risk Item/Data | Employment profile B | Short term employment value (5 years) | Long term employment value (20 years) |
| OCCUPATION | Skilled | | |
| EDUCATION | Below hi school | | |
| INDUSTRY | Mining | | |
| AGE & SEX | M; 16-24 | | |
| REGION | Pacific | | |
| Unemployment or employment security score | 400 | | |
| Current income level | $34,000 | | |
|     Expected income growth rate per annum | | 2.20% | 2.50% |
|     Total income potential | | $181,555 | $890,231 |
|     Income risk due to unemployment risk | | $22,431 | $109,990 |
|     Expected years of similar employment | | 5 | 20 |
| Total employment value | | $159,123 | $780,241 |
| Profile B Employment Value Score | | 212 | 260 |

| | | | |
|---|---|---|---|
| *New profile with changes in industry and occupation results in an increase (decrease) in income potential of:* | | 14.0% | 17.1% |

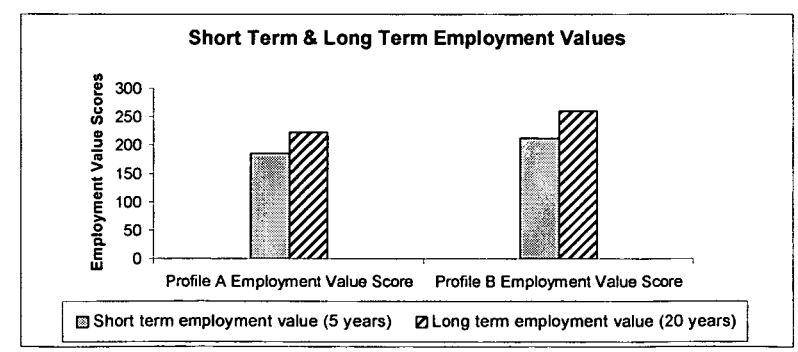

UNEMPLOYMENT RATE ACTUALS & FORECAST

PRIVATE UNEMPLOYMENT POLICY BENEFITS TIMELINES

PREMIUM CALCULATION METHODOLOGY
Figure 19

CLASS POLICY PREMIUM CALCULATION

For employees belonging to a risk class which has an unemployment risk score of 550 and where average insurance claim is $1,000.00 per month for 6 months.

| PREMIUM INFLUENCING FACTORS | | Policy Premium per. Month |
|---|---|---|
| BASE EXPECTED UNEMPLOYMENT RATE | 6.00% | |
| SELECTED CLASS UNEMPLOYMENT RISK SCORE | 550 | |
| SELECTED CLASS EXPECTED UNEMPLOYMENT RATE | 6.50% | |
| ADJUSTMENT FOR ADVERSE SELECTION RISK | 1.08 | |
| BASE LOSS RATE | 7.02% | |
| AVERAGE BENEFITS PAYOUT (@ $1000 P.M. FOR 6 MONTHS) | $6,000 | |
| BASE PREMIUM | | $35.10 |
| BUSINESS OPERATIONS ADJUSTMENT FACTOR | 1.225 | $43.00 |
| PROFIT MULTIPLIER | 1.08 | |
| TOTAL POLICY PREMIUM | | $46.44 |
| HISTORICAL PREMIUM COMPARISON ADJUSTMENT | 0.95 | $44.12 |
| SPECIAL PROMOTIONAL ADJUSTMENT | 0.98 | |
| FINAL POLICY PREMIUM | | $43.23 |

BASE POLICY PREMIUM CALCULATION

Figure 20

Monthly Base Policy Premium
Calculated for Various Compensation Amounts and Durations.

| Desired Compensation Amount p.m. | Months of Unemployment Compensation Desired (For policy coverage period of 1 year, compensation only if unemployed) | | | |
|---|---|---|---|---|
| | 3 | 6 | 9 | 12 |
| $ 500 | $ 7.50 | $ 15.00 | $ 22.50 | $ 30.00 |
| $ 750 | $ 11.25 | $ 22.50 | $ 33.75 | $ 45.00 |
| $ 1,000 | $ 15.00 | $ 30.00 | $ 45.00 | $ 60.00 |
| $ 1,250 | $ 18.75 | $ 37.50 | $ 56.25 | $ 75.00 |
| $ 1,500 | $ 22.50 | $ 45.00 | $ 67.50 | $ 90.00 |
| $ 1,750 | $ 26.25 | $ 52.50 | $ 78.75 | $ 105.00 |
| $ 2,000 | $ 30.00 | $ 60.00 | $ 90.00 | $ 120.00 |
| $ 2,250 | $ 33.75 | $ 67.50 | $ 101.25 | $ 135.00 |
| $ 2,500 | $ 37.50 | $ 75.00 | $ 112.50 | $ 150.00 |
| $ 2,750 | $ 41.25 | $ 82.50 | $ 123.75 | $ 165.00 |
| $ 3,000 | $ 45.00 | $ 90.00 | $ 135.00 | $ 180.00 |

Note: Above base unemployment policy premium calculation is for illustration only.
A claim rate of 6% is assumed for this example.
Actual premium calculation would also depend on expected unemployment duration Explanation:
From the above table it can be seen that if a worker chooses to receive unemployment compensation payment of $1000 per month for a maximum duration of 6 months, payable in case of involuntary unemployment anytime during the policy coverage period of 1 year, then his/her base policy premium would be $30 p.m. However, if the individual opts for lower compensation amount of $750 p.m. for 3 months then the base policy premium reduces to just $11.25 per month.

UNEMPLOYMENT RISK SCORE AND PRIVATE INSURANCE FOR EMPLOYEES

BACKGROUND OF THE INVENTION

1. Field of the Invention

The present invention relates generally to the field of unemployment insurance, and, more particularly, the present invention relates to the calculation and utilization of unemployment risk scores in the unemployment insurance industry.

2. Description of the Background

Unemployment is a reality, and it can happen to any employee at almost any time. Presently, employees do not have access to any scientific unemployment risk score to assess their employee unemployment probability or any evaluation tools or techniques to analyze and manage their unemployment risk. At the same time, employees do not have any alternative to government unemployment insurance, e.g., a source for securing additional unemployment insurance from non-government insurers, through which the employee may lessen the financial burden of termination.

As of August 2003, there is only one provider of unemployment insurance to employees—the United States government. No other type of unemployment insurance is commonly available to employees either from the government or a private concern, and hence there exists a real need for additional unemployment insurance alternatives for employees.

The unemployment insurance program is a federal-state partnership based upon federal law but administered by state employees under state law. This federal-state unemployment compensation (UC) program, created by the Social Security Act of 1935, provides temporary and partial wage replacement to only those employees who have become unemployed through no fault of their own, who are able to work, who are available for work, and who are actively seeking work.

The government unemployment insurance (UI) program is funded almost entirely by employers through federal and state unemployment taxes paid through payroll taxes. Employees are not required to make any insurance premium payments under this program, except in 3 states, and unemployment compensation is paid to those employees who meet the eligibility requirements set by employee states.

Government unemployment compensation (UC) benefits, though helpful, are insufficient to maintain an adequate standard of living. For example, the government unemployment insurance program replaces only a portion of eligible unemployed employees' lost income for a limited time, which is typically 26 weeks. Studies show that since 1990, the percentage of lost income replaced by government UI benefits across the 50 states has fallen five percentage points, and in 1999, UI benefits replaced only 33% of an average employee's lost earnings.

Some employers do offer some form of unemployment benefits when an employee's job is terminated involuntarily. Such unemployment compensation typically is in the form of a one-time severance payment and is mostly based on some pre-negotiated agreement or as part of the standard corporate HR policy of the employer. However, the severance is typically a one-time payment ranging between 2-4 weeks of salary.

Employees can manage their unemployment-related monetary risk by purchasing credit protection insurance, enrolling into credit protection plans or by buying event or asset-specific insurance (e.g., mortgage insurance). These plans insure the employee from the negative consequences arising out of non-payment of their monthly or scheduled payment obligations due to unemployment. Typically, these insurance and credit protection programs are specific to the payment obligations related to the company offering this protection or insurance, and they do not make any cash disbursements to the person in case of unemployment.

Unemployment is almost always undesirable and can impose significant financial hardship on the unemployed and their families, particularly if the unemployment is involuntary through no fault of the employee (e.g., due to layoffs, mergers, acquisitions, restructuring, and/or closure). Studies show that presently, of the average number of total unemployed each month, involuntary job losers are about 44% (currently about 3.5 million people), and the current average duration of unemployment is over 17 weeks.

The unemployment rate has recently increased significantly, and millions of Americans who are suddenly involuntarily unemployed are finding that their families cannot survive on government unemployment insurance alone. Current government UI benefits are inadequate for an average employee to maintain a safe and decent standard of living based on realistic local costs faced by families for food, housing, child care, health care, tuition, car, mortgage, credit cards, transportation, taxes, and other necessary expenses.

The average weekly government UI benefit amount for 2001 was just $237 per week. According to published studies in virtually every state, UI benefits for a typical employee with children will fall short of what a family needs to meet its living expenses.

For example, studies show that at current UI benefits level, a single working parent with two children will fall $1,317 short each month of the amount of money needed to maintain a minimal, no-frills living standard. In a two-parent, two-child family with one full-time and one part-time employee, UI benefits (for the full-time employee) will be $334 lower each month than the amount needed to meet basic needs. Further, estimates do not include the extra expenditure that the unemployed person might incur for procuring non-employer supported healthcare insurance and for expenses related to a job search.

Hence, there exists a definite need for better unemployment insurance coverage for employees so that they can manage their financial needs during involuntary unemployment situations without having to make unnecessary compromises that might have consequences that threaten the safety, security and well-being of the employee, their families and the communities in which they live. Without adequate unemployment insurance, employees also fail to contribute positively to a healthy consumer spending rate which is necessary for the nation's economic stability in times of an economic downturn.

Private unemployment insurance is a very complex and difficult subject, and the proof of the complexity lies in the fact that thus far no private concern has made such insurance available to the public. The present invention preferably addresses many problems and challenges inherent to the provision of private unemployment insurance to employees.

Some industry experts and persons of the trade believe that private unemployment insurance has not been available to employees because of one, many, or all of the following reasons: (a) the loss risks associated with such a private insurance program are perhaps not manageable by a non-government entity; (b) major risks include adverse selection and moral hazard, both of which are very difficult to address and overcome; (c) pricing of premium may be very complex and challenging; (d) estimation of losses may be very complex and difficult; (e) design and administration of policy benefits is very complicated and difficult; (f) capital requirements for the private entity providing such insurance may be prohibitive due to very high loss reserves required for periods of economic slowdown; (g) state and federal regulations may be restrictive to the private insurers; (h) the federal-state provides mandatory unemployment insurance for all employees and because such a program exists, there is little room for private unemployment insurance; (i) economic downturns could result in large number of claims that may be difficult to forecast and manage; and (j) unemployment insurance products when offered by a private entity that has only one such product line may not be sufficiently diversified to manage losses arising out of extraordinarily high number of claims during recessions, depressions, etc.

Although these are all valid concerns and there are enormous business risks involved in providing private unemployment insurance, as is the case with any insurance business, the present invention, in its preferred embodiments, addresses one or more of the above-mentioned concerns, as explained below. Specifically, the present invention, is generally directed to the calculation of unemployment risk scores for employees and the provision of supplemental or primary private unemployment insurance to employees when they lose their jobs involuntarily. More particularly, the present invention pertains to systems and methods for predicting unemployment risk using a risk index and score and methods and apparatuses for writing policies to insure employees against the occurrence of a specified unemployment condition, such as an involuntary termination or involuntary loss of employment for a specified period of time. These systems and methods provide private unemployment insurance in a manner which gives employees a choice, control, and flexibility with respect to their desired level of income if, and when, they become involuntarily unemployed.

SUMMARY OF THE INVENTION

As stated above, employees presently have no way to properly assess their unemployment risk or to find a structured and scientific way to predict their likelihood of facing unemployment. A person may have a general idea of his or her unemployment risk based on economic news and industry reports, but no effective method to quantitatively and qualitatively score an employee's unemployment risk currently exists. Employees also do not have access to unemployment risk measurement and prediction tools that allow them to measure their "potential" unemployment risk based on future choices that may be made concerning their jobs, such as education, location, industry, etc.

The present invention, in at least one preferred embodiment, provides a scientifically calculated unemployment score for employees based on their personal employment characteristics and national employment and unemployment data that indicates the employee's likelihood of becoming unemployed in a given period.

Employment is one of the most basic and essential requirements for most employees, and it plays a pivotal role in their economic, intellectual, mental, physical, emotional, psychological, social, and general well-being. Unemployment risk cannot be eliminated, but it can be reduced, and its impact better managed through this invention's four key aspects: scoring of unemployment risk, scoring of employment value, providing unemployment risk mitigation solutions, and providing private unemployment insurance to employees.

The present invention also preferably provides unemployment risk scores assessing unemployment risk of employees based on their employment profiles. Unemployment risk scores allow employees to understand their present and future unemployment risks based on their current and future employment profiles. For example, employees can compare their present unemployment risk with a potentially new unemployment risk based on their career plans allowing the employee to make more educated decisions impacting their employment outlook.

The present invention also preferably provides employment security scores for assessing employees' employment security. Employment security scores allow employees to assess their probability of remaining voluntarily employed, or the chances of not becoming unemployed, in their present and future jobs. Such scores and ratings allow employees to assess factors affecting their job security and to compare job options based on their respective job security probabilities. An employment security score is similar to an unemployment score for an employee. The difference is in the way scores are computed, which may be the same or different depending on selection of unemployment risk variables and the score scale.

In an additional embodiment, the present invention provides for the scoring and rating of short term and long term employment value of employees which allows employees to make more informed career decisions. An employment value score uses an employee's unemployment risk score and/or employment security score in combination with other factors such as: the employee's probability of finding the desired type of employment; income potential; cost of living; savings potential; and growth projections. For example, the short term employment value of a construction job may be greater than for a mining job, but the long term or lifetime employment value of a mining job may be much greater if experience in the mining industry is deemed to be more valuable than experience in the construction industry.

The various employment and unemployment scores and reports of the present invention are intended to help employees evaluate their present and future employment options and career paths, and make appropriate decisions that would then maximize their career and income potential. Businesses may find these scores useful in assessing their present and future customers' credit and business risks associated with employment.

The present invention also preferably provides unemployment prediction tools with which employees may construct scenarios related to their future employment influencing decisions and understand how those decisions would affect their unemployment risk and unemployment score. For example, by using an unemployment prediction tool, an employee can assess his new unemployment risk by assuming a new job location, job industry, occupation, or a different education qualification. By being able to understand "potential" unemployment risk from unemployment scores for various scenarios, the employee may make more informed decisions—allowing the employee to minimize his or her unemployment risk and maximize his income potential.

Another aspect of the present invention is to provide employees and organizations with predictive modeling and decision analytics for unemployment risk, including employee unemployment risk score calculators and unemployment prediction tools. The utility and significance of an unemployment risk score can be better understood by comparing it with credit scores, which predict an employee's credit risk and his or her likelihood of managing financial obligations. Credit scores may be used by lending institutions and other organizations in making decisions pertaining to offering products and services. Along the same lines, unemployment scores are valuable to employees and organizations in assessing and predicting unemployment and associated income risk in their effort to establish and manage relationships with employees.

Another aspect of the present invention is to offer employees a private unemployment insurance choice by allowing them to purchase unemployment insurance from a private insurer to cover them in the event of involuntary unemployment. The insurance preferably offers the employees choice, control and flexibility with respect to their coverage and benefits level, and where the total amount of coverage and benefits are selected by the employee. The premium for the insurance may be paid by the employee based on the desired policy coverage.

For purposes of this invention, an employee is deemed to be involuntarily unemployed when he becomes unemployed for no fault of his, but due to other external reasons beyond his control such as layoffs resulting from economic downturns, employer restructuring, relocation, bankruptcy, sale, and/or closures. Involuntary unemployment doesn't apply if the employee quits, goes on strike, or is fired for misconduct, improper performance or dishonesty. Involuntary unemployment criteria also generally doesn't apply to self-employed people, retirees, people on disability or employees of businesses that shut down routinely (e.g., ski resorts that close for the summer) tourist attractions that only operate certain months, or businesses that employ employees on a part-year or seasonal basis.

In effect the present invention allows employees to purchase private unemployment insurance irrespective of whether or not they are covered by government unemployment insurance. Such private unemployment insurance offers various levels of benefits for various ranges of premiums. For employees who are presently insured under the mandatory government unemployment program, the present invention offers an option to secure additional or supplemental unemployment insurance that increases their current level of unemployment compensation benefits to a level that makes them more comfortable and secure. Likewise, for those employees who are not covered by the government unemployment compensation program, the present invention provides them with an opportunity to secure primary unemployment insurance coverage from a private insurer. Presently, no private entity is known to provide primary or supplementary unemployment insurance.

In short, the present invention involves a method of establishing a risk-based pricing structure and determining policy premiums by using: computer based unemployment risk scoring models, programs, and algorithms; historical and forecasted employment and unemployment related data by industry, geography, and demography; historical and forecasted macroeconomic data; employee and employer data; appropriate unemployment risk categories for employees; historical policy performance data; and loss forecasting techniques, leading to the development of a private unemployment insurance program.

In alternative embodiments, the present invention may also involve the use of: capital adequacy and risk management strategies such as, hedging, investing, reinsuring, managing adequate loss reserves and meeting capital adequacy requirements, cross-selling, bundling of employment related services; the adoption of a diverse range of policy sales and marketing techniques, marketing and co-marketing arrangements, branding and co-branding agreements, premium collection methods, and agency agreements; and strategic distribution and licensing agreements related to the sale and fulfillment of insurance policies. The private unemployment insurance provider is able to write policies based on the above methodology such that the policy price, conditions and terms are determined for employee employees based on their unemployment risk and the level of coverage desired.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 5 is a flow diagram depicting the steps in the premium determination process;

FIG. 6 is a block diagram illustrating an exemplary claim fulfillment process;

FIG. 7 is a flow diagram depicting the steps carried out in an exemplary benefits payment process;

FIG. 8 is a flow diagram depicting the steps carried out in an exemplary employment value score determination process;

FIG. 9 shows exemplary unemployment risk categories and their constituent risk variables;

FIG. 10 shows exemplary unemployment rate forecasting variables;

FIG. 11 depicts an exemplary method of computing unemployment risk factors for variables belonging to selected unemployment risk categories;

FIG. 12 shows an exemplary method of segmenting a target employee population into four homogeneous risk classes and computing their unemployment risk factors and rates;

FIG. 13 shows an exemplary method of segmenting a target employee population into five homogeneous risk classes and computing their unemployment risk factors and rates;

FIG. 14 shows the steps carried out in an exemplary unemployment rate computation process for a selected risk class;

FIG. 15 depicts an exemplary method of computing unemployment scores;

FIG. 16 shows the steps carried out in an exemplary computation of short term and long term employment values and employment scores;

FIG. 19 shows the steps carried out in the calculation of an exemplary unemployment insurance policy premium; and FIG. 20 shows an exemplary calculation of monthly base unemployment insurance policy premiums for a range of compensation amounts and durations.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Generally speaking, the present invention provides systems and methods to quantify and predict employees' unemployment risks and provide consumer unemployment risk scores to employees and organizations. Specific methods and systems for quantifying unemployment factors resulting in an unemployment risk score which scores and predicts unemployment risk are provided. The unemployment score is somewhat similar to a credit score (which predicts credit risk) as it measures and predicts an employee's unemployment risk.

Another aspect of the present invention involves the provision of private unemployment insurance to protect employees when they lose their jobs involuntarily, (i.e., through no fault of their own) either as a primary unemployment insurance or as a supplementary unemployment insurance. The present invention creates and offers flexible unemployment insurance programs such that employees can select a compensation amount of their choice, select the compensation payment duration of their choice, select from different beginning and end of compensation payment periods, and select a policy with a premium amount of their choice. Effective private unemployment insurance provision involves a number of steps which are described in detail below.

Figure 1:
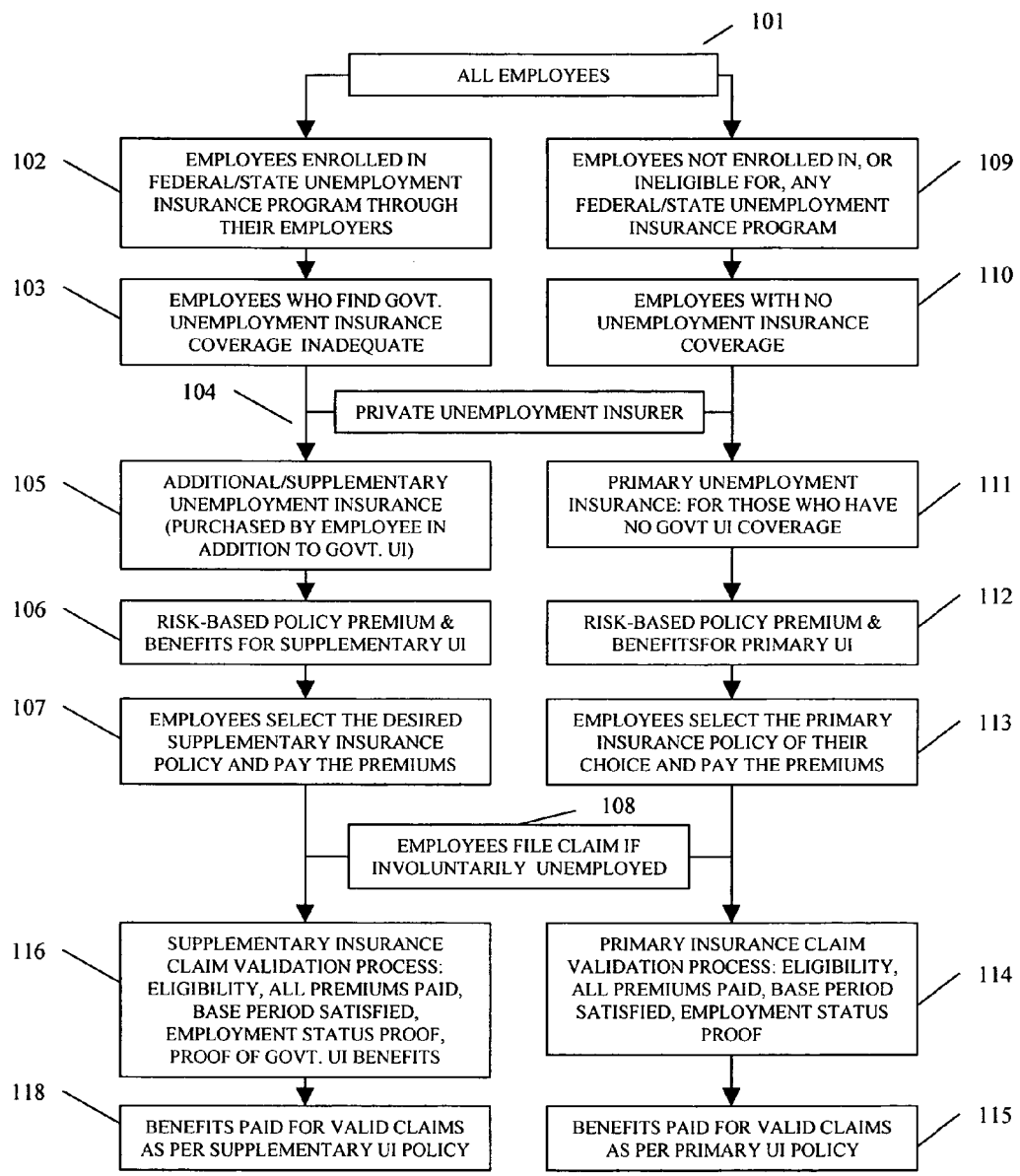
FIG. 1 depicts a private unemployment insurance model illustrating the two main types of policies: supplementary private unemployment insurance and primary unemployment insurance.

In one preferred embodiment generally set forth in FIG. 1, risk-based pricing (FIG. 3) is used to determine the price of a primary or secondary unemployment insurance policy payable by the insured employee. In this embodiment, the pricing model (shown in FIGS. 2A and 2B) is constructed, and policy pricing is determined, using a variety of different information. This information may optionally include: historical and forecasted data regarding unemployment rates and duration of unemployment (e.g., categorized by employers, industry segments, industries, industry classes based on SIC classification, counties, cities, telephone area codes, and other geographical classifications); the employee's historical employment data, credit history, or other demographic data; and/or an employer's historical unemployment data.

A motivation of the present invention is the fact that unemployment insurance coverage is currently either inadequate or is not at all available to many employees. In more detail, the block diagram of FIG. 1 shows that of all employees 101, public unemployment insurance coverage is available only to some employees 102 and is not available to some others 109. For employees covered by public unemployment insurance 102, employers pay for this mandatory insurance and employees have no say in the level of applicable coverage and benefits.

The public unemployment insurance replaces less than half of lost income in case of an involuntary unemployment, and that being largely inadequate, there is currently no way for the employee to get a higher level of insurance protection or added security. The present invention provides the extra security and protection sought by many through a private supplementary unemployment insurance program 105 to those employees who are eligible for public unemployment compensation 103.

Employees who are already covered under the public/government unemployment insurance program 103 would maintain their coverage but through this invention they could purchase supplementary unemployment insurance from a private insurer 104, just as one buys extra medical, life, property, travel and other insurance today. This supplemental insurance provides a level of coverage with which the employee is comfortable. The employee preferably pays the premium for the supplemental insurance and has the choice and freedom to benefit from supplementary insurance for as long as the employee desires with a range of coverage options that continually meet the employee's needs. The insurance program where insurance is purchased and paid for entirely by employees, coverage is decided entirely by employees and benefits are provided entirely to employees and where no contribution is required either from employers or government.

In this unemployment insurance method, premiums are preferably calculated based upon an employee's desired level of unemployment compensation amount, employee's unemployment risk score, forecasted unemployment rates and business factors based on computer-based scoring models and programs, mathematical models, statistical techniques, neural networks, financial and actuarial methods, algorithms, historical and forecasted employment data, unemployment data, industry data, macroeconomic data, databases, computer systems, computer networks, data libraries, data exchange software, score generation models, and forecasting techniques.

One aspect of the present invention is the use of computer-based methods consisting of sophisticated algorithms, computer software, computing systems, mathematical models, advanced programs, electronic databases, analytical tools and experts in economics, accounting, actuarial processes, statistics, modeling, programming, systems, integration, insurance, legal affairs, government regulations, marketing and sales, administration, and management in order to define, model, analyze, and develop private supplementary and primary unemployment insurance services.

Another aspect of the present invention is the use of a computer-based method for administering unemployment risk score, employment security score, short term and long term employment value, employee application for unemployment insurance, risk-based insurance pricing determination, risk classes determination process, approval process, unemployment risk determination process, coverage and premium determination process, claim processing and validation, benefits administration process, periodic review of unemployment status and benefits duration determination process, coverage expiry determination process, policy renewal process, discount and credit evaluation and renewal application process, records storage process, records update process, algorithm update process, historical and forecast trends update process, risk score adjustments process, risk categories update process, benefits and terms and conditions update process, and organizational structuring process.

FIG. 1 shows that for those employees not covered by public unemployment insurance 109 and for those who desire unemployment insurance 110, the present invention provides private primary unemployment insurance coverage 111 and for those employees who already have public or government unemployment insurance 103 and need additional insurance coverage this invention intends to provide private secondary unemployment insurance coverage 105. The premiums for private primary unemployment insurance coverage 112 or supplementary unemployment insurance coverage 106 are calculated based on an employee's risk class and coverage option desired by the employee. Private primary unemployment insurance coverage 107, and secondary unemployment insurance coverage 113, for employees would be initiated by a private insurer 104 after successful completion of the application process, payment of required premiums and dues, and upon satisfactory completion of policy procedures.

In the event that employees covered by private unemployment insurance become involuntarily unemployed, the employees would file a claim with the insurer 108. These claims would then be verified for accuracy and validity 114, which for supplementary insurance holders includes proof of government unemployment compensation 116, and benefits would be paid to qualifying claimants as per the policy terms and conditions 118, 115.

Figure 2A:
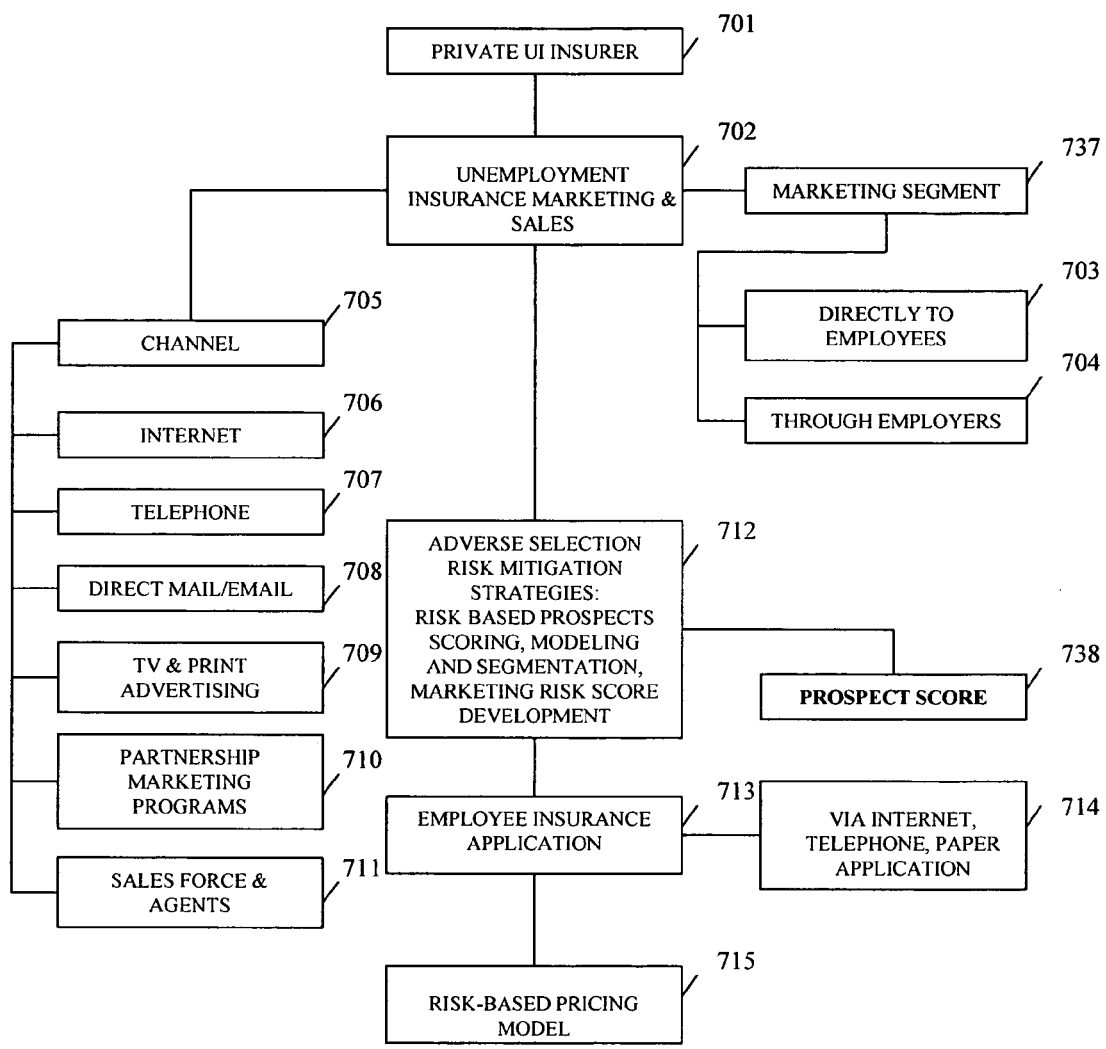
FIG. 2A is a detailed block diagram of the first half and FIG. 2B is a detailed block diagram of the second half of a preferred embodiment of a private unemployment insurance model for use by a private provider of unemployment insurance.

FIG. 2A shows a detailed diagram of a private unemployment insurance method and model for use by a private provider of unemployment insurance 701. The primary elements of this business model driven by the present invention include: unemployment insurance marketing & sales 702; channels 705 consisting of internet 706, telephone 707, direct mail and email 708, television and print advertising 709, partnership marketing programs 710, sales force and agents 711; and marketing segments 737 consisting of employees 703 and employers 704; adverse selection risk mitigation strategies 712; and the development of a prospect score 738. Marketing strategies and programs would result in employees applying for unemployment insurance 713 through the internet, telephone, and paper applications 714 which then are evaluated using a risk based pricing model 715.

Figure 2B:
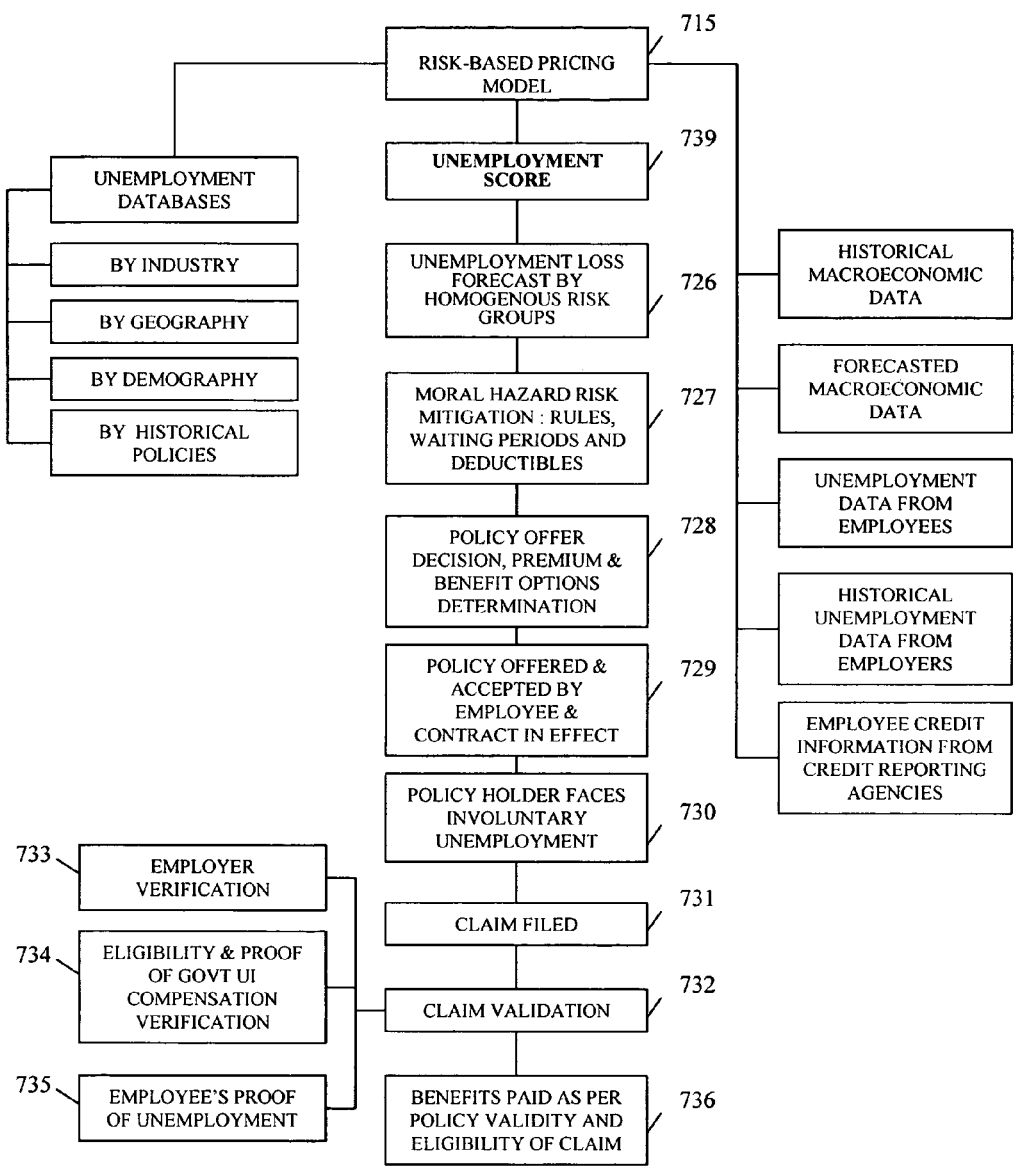

FIG. 2B, shows the risk-based pricing model 715 consisting of unemployment score 739, historical unemployment characteristics data, unemployment loss forecasts by risk classes 726, moral hazard risk mitigation techniques 727, policy benefits and premium determination techniques 728 which results in policy offer conversion into a contract 729. When the policy holder faces involuntary unemployment 730, a claim is filed 731, which goes through a claims validation process 732 consisting of employer verification 733, benefits eligibility and proof of government UI compensation verification 734 and employee's proof of unemployment 735. Further, the claim validation process benefits are paid as per policy validity and eligibility 736. The risk based pricing model 715 involves the calculation and generation of an unemployment risk score as shown in 739, 206 (FIG. 3) and 329 (FIG. 4A).

Figure 3:
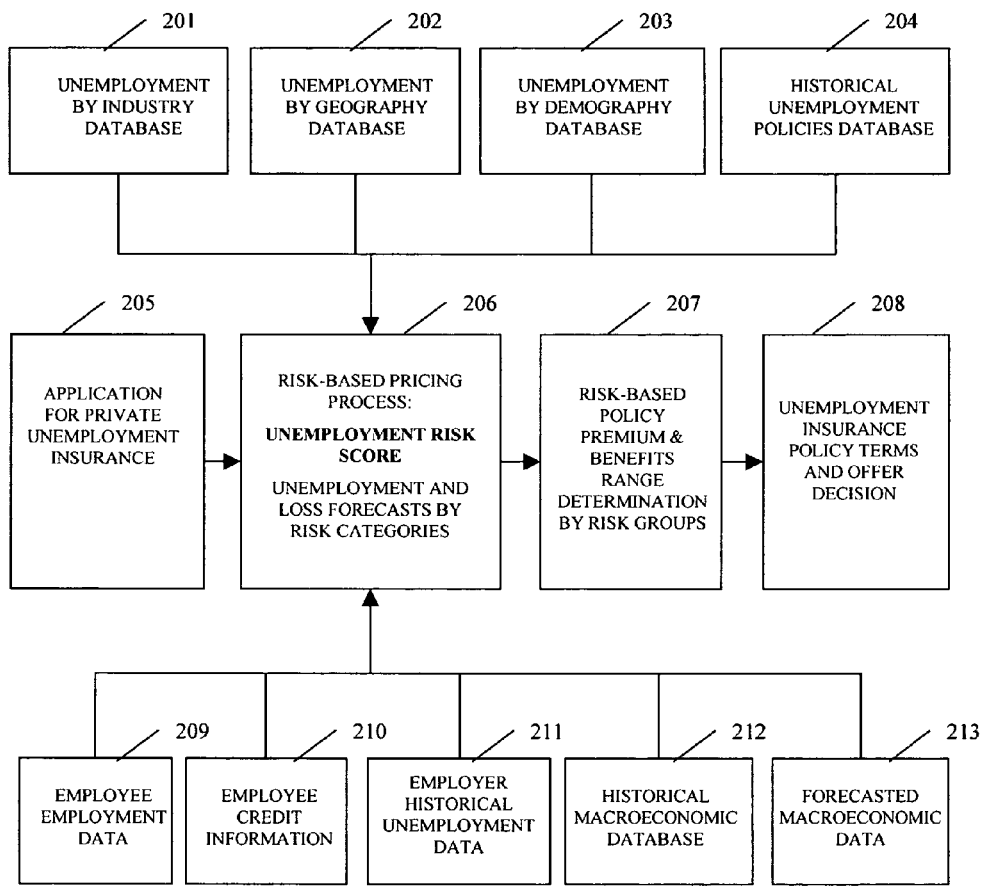
FIG. 3 is a block diagram of an exemplary risk-based pricing model.
Figure 4A:
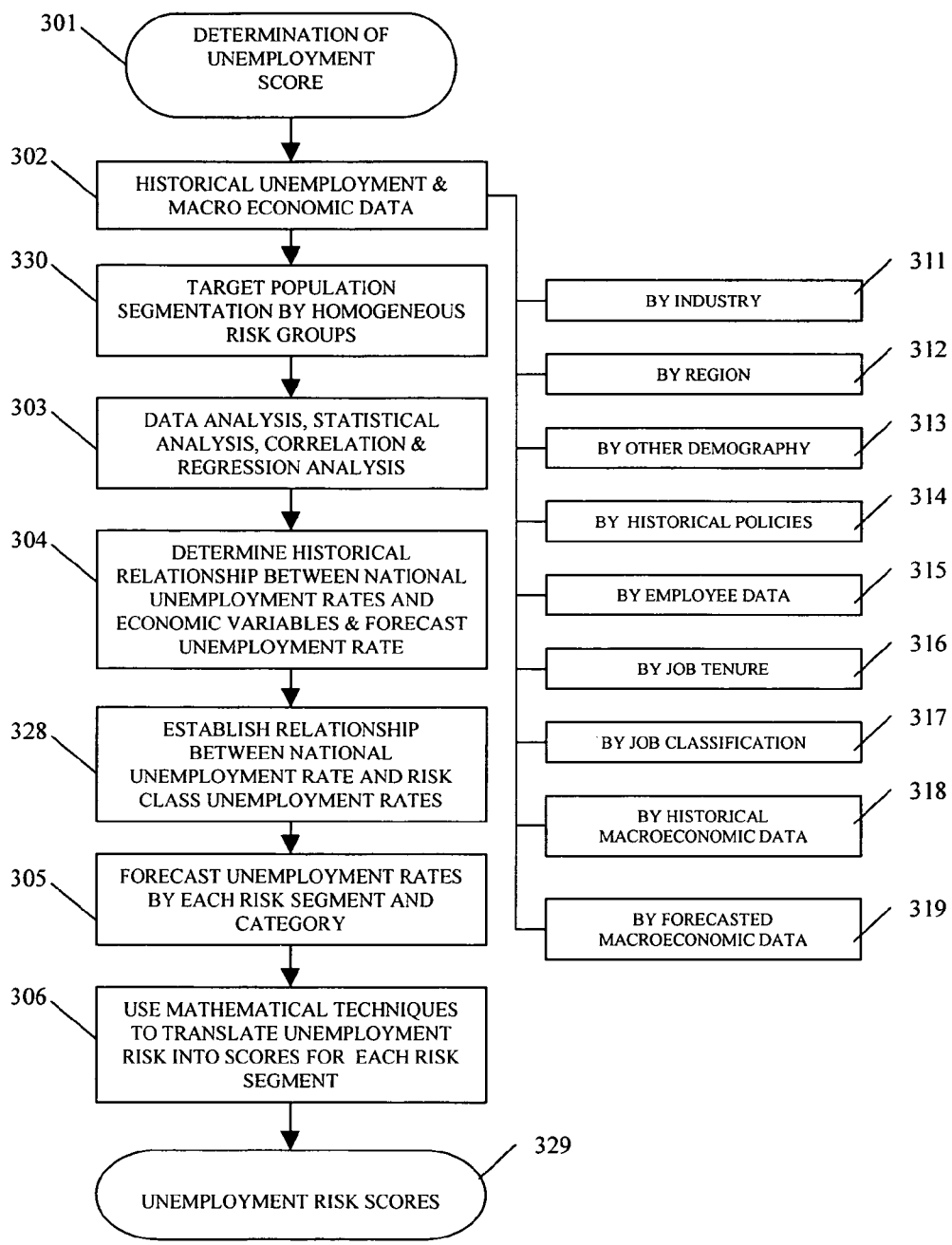
FIG. 4A is a flow diagram of an exemplary unemployment score determination process and FIG. 4B is a flow diagram of an exemplary risk based policy pricing and premium determination process of the private unemployment insurance model.

As shown in FIG. 3, all employees would be grouped by homogenous, risk classes based on risk variables. Employees applications for insurance 205 are subjected to a risk based pricing process 206 and their policy premium and benefits are determined by risk groups 207 which leads to an unemployment insurance policy offer decision 208. Some of the key variables databases used by the risk based pricing process 206 used in the present invention preferably consist of unemployment data by industry 201; unemployment data by geography 202; unemployment data by demography 203; and historical unemployment policies' data 204. Again, these databases are not exclusive to the present invention and merely indicate an exemplary or preferred embodiment. Other elements or variables could be used to provide input to the pricing model of this invention in a similar spirit.

The above databases would consist of regional and national employment and unemployment figures, involuntary unemployment figures, government unemployment insurance claims, government unemployment insurance claim acceptance rates, government unemployment insurance benefit payment rates and amounts, duration of government unemployment insurance claims, and federal and state unemployment insurance fund data.

Historical policy data 204 would generally include employees' previous unemployment claim data, where such data can be legally obtained, and the private insurer's in-house policy data. It may be noted that a private unemployment insurance company would have to build historical policy and loss data as policies begin to be written and serviced due to absence of any private unemployment insurance data. Where necessary historical data is not available, the insurance company has the option of computing it from other relevant data or extrapolating it from consumer surveys.

FIG. 3, also shows that an employee's unemployment history 209, credit information 210, employee's employer's unemployment history 211 will be important elements of the risk-based pricing model 206 in identifying employee's applicable risk class. Other elements of the pricing model may include historical macroeconomic data 212 and forecasted macroeconomic data 213 which are used to forecast risk class specific unemployment rates, policy losses and calculate premiums.

Estimation of an employee employee's premium would be dependent on the employee's categorization to a risk class and the employee's desired level of coverage. At the time of policy application, information related to an employee's unemployment history 209, credit information 210, and employee's employer's historical unemployment data 211 would be gathered to establish employee's risk class, premium and terms and conditions.

Another aspect of this invention is the determination of homogenous risk classes identifying employee classes demonstrating similar unemployment risk characteristics. Some of the risk variables used to segment the target population may be education, industry, age, gender, occupation, state, region, income, work experience, training level, work performance, job change frequency, industry change frequency, historical unemployment data, unemployment severity, job necessity, debt-to-income ratio, expenses-to-income ratio, and job confidence.

It is noted that there are an infinite number of ways to create homogenous classes of people with similar risks for the millions of people nationwide. Because there never has been a private unemployment insurance provider to date, there is no actuarial data available by any established risk classes related to unemployment rates, policy loss rates and premiums. Therefore, the present invention also presents a method and model to segment the labor force into homogenous unemployment risk classes and establishes a theoretical relationship between historical unemployment rates and risk classes (in order to eventually offer risk-appropriate private unemployment insurance to the employee).

As shown in FIG. 4A, this invention provides a method to segment a target population into homogenous risk classes 330 and to forecast unemployment rates 305 and determine unemployment risk scores 329 for each of the risk classes, and persons skilled in the art may easily be able to understand how to choose classes and determine class specific risk factors and unemployment rates. This invention preferably uses a combination of unemployment risk categories 302 such as, employees' occupation, geographic location, age and gender, education, etc., to define a homogenous unemployment risk class. The total number of existing risk classes 330 for which a unique unemployment rate would be determined depends upon the number of categories 302 selected and the sub-categories in each category. As detailed in the following description, the number of classes could be in the hundreds or even thousands, demonstrating the number of risk classes formed from unique combinations of all selected sub-categories.

An example of a risk class includes all men in the age bracket 25-54 years a with college education, who work in the construction industry in a managerial position and live in the state of Delaware. However a similar class of men with exactly the same sub-category characteristics but living in New York would form a different class. From this example, it can be seen that controlling for all variables except for geographical location, there are 50 different classes just for the 50 different states.

The total number of classes may be quite high given the fact that there are many sub-categories within each category. For example, if the entire U.S. labor force of about 150 million people is represented by 4 categories with 3 of the categories consisting of 5 sub-categories and one category with 50 sub-categories, then we would have 5×5×5×50=6,250 unique homogenous risk classes—wherein each unique and homogenous risk class would consist of an average of approximately 24,000 employees. Such a granular and homogenous classification would allow for a very appropriate determination of unemployment risk leading to an accurate loss rate estimation and premium determination for the provision of unemployment insurance.

FIG. 4A shows an exemplary unemployment risk score calculation method. Unemployment risk score calculation 301 depends on an accurate forecast of overall national unemployment rates followed by a detailed forecast of unemployment rates by appropriate risk classes. Specifically, unemployment score determination 301 is based on the segmentation of a target population into homogeneous risk classes 330 and on historical unemployment and macroeconomic data 302 (e.g., unemployment data by industry 311, by region 312, by other demographic factors 313, by historical policies 314, by employees 315, by job tenure 316, and by job classification 317 as well as by historical macroeconomic data 318 and forecasted macroeconomic data 319). Historical unemployment and macroeconomic data can be obtained from a multitude of sources consiting of the Bureau of Labor Studies, other government sources, public and private publications, research companies, businesses and consumer surveys.

The historical unemployment data and macroeconomic data 302 is analyzed using techniques consisting of statistical analysis, advanced data analysis, correlation and/or regression analysis 303 to determine a historical mathematical relationship between national unemployment rates and macroeconomic variables which then is used to forecast unemployment rates 304. In the next step, a relationship is established between national unemployment rates and risk class unemployment rates 328 which is used to forecast unemployment rates for each risk segment 305, which in turn are translated into unemployment risk scores 329 using mathematical techniques 306.

Forecasting of unemployment rates by homogenous risk classes is a key aspect of this invention. FIG. 10 shows exemplary unemployment forecasting variables relating to the economy, trade, industrial production, business, consumption, credit, and income. These variables are preferably used in a regression model 303 (described above) to establish a reasonable historical relationship with U.S. unemployment rate 304. Such mathematical relationships can then be used to forecast unemployment rates. An example of such a forecast can be seen in FIG. 17, where the unemployment rate forecast for 2003, 2004 and 2005 is 6.1%, 5.8% and 5.5%, respectively.

Figure 17:
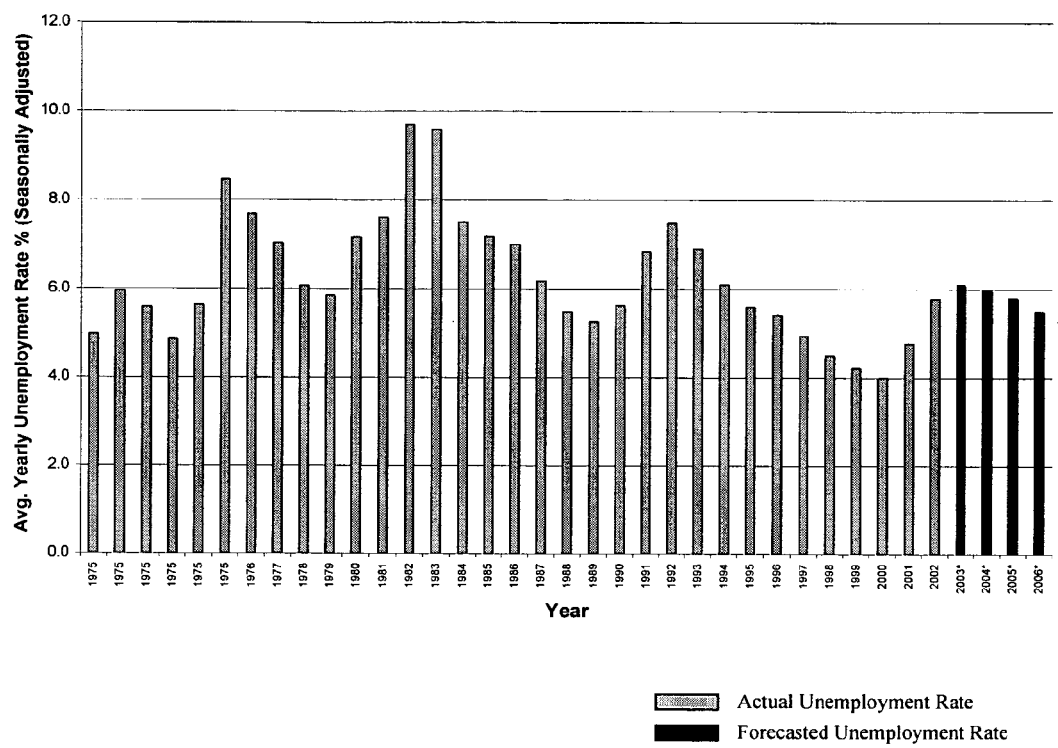
FIG. 17 shows an exemplary 4-year forecast of national unemployment rates along with historical rates.

The particular choice of forecasting variables and the regression method for forecasting a national unemployment rate which may be used are not exclusive, or limited to, those in FIG. 10 and FIG. 17, respectively. Key unemployment rate forecast variables consist of consumer price index, producer price index, interest rates, trade balance, housing starts, industrial production, currency exchange rates, retail sales, personal income and credit, consumer expenditure, industry capacity utilization, government spending, capital spending, consumer confidence and other economic data. These represent one selected embodiment of this invention.

Other unemployment rate forecasting methods, such as forecasting and simulation software, non-regression mathematical techniques, trend-based forecasting methods, probability and game theory methods, surveys, and blended techniques, could be used in a similar spirit by any person skilled in the art of forecasting and modeling to forecast a national unemployment rate and achieve similar results as shown in FIG. 17.

As shown in FIG. 4A, based on historical unemployment data by variables (i.e., industry 311; region/geography 312; other demography 313 such as age, gender, education, income and credit characteristics; historical policies 314; employee data 315; job tenure 316; job classification 317; historical macroeconomic data 318 and forecasted macroeconomic data 319), the entire employee population could be segmented into unique and homogenous risk classes 330. As explained above, each of these homogenous risk classes would consist of hundreds or even thousands of employees, and the unemployment rate would be estimated for each unique and homogenous risk class by establishing a historical relationship for unemployment rates between national unemployment rates, unemployment rates by variables, and risk classes.

Another example of a unique risk class using 4 variables would be: employees in the manufacturing industry, living in Delaware, in the age class 21-65 years and having a high-school education. As seen from this example, there could be hundreds and thousands of risk class possible depending on the exact selection of variables. Such categorization of employees into risk classes would allow for a flexible, customized and more appropriate unemployment risk assessment and premium pricing.

Employee risk class unemployment rate forecasts are estimated using mathematical and algorithm based modeling techniques 303, including but not limited to, a regression analysis using various unemployment variables. This is a two-step process. First, the overall unemployment rate is forecasted using its historical relationship with economic variables 304. Second, a formula-driven relationship is established between the national unemployment rates and employee risk classes 328. Lastly, using the forecasted national unemployment rates and their relationship to the risk class unemployment rate, forecasts for each employee risk class unemployment rates 305 are computed. Forecasted unemployment rate probabilities are then converted 306 into unemployment risk scores 329 for each particular risk segment. An example of calculated unemployment risk scores is shown in FIG. 15 wherein unemployment risk scores are computed for various risk classes having different unemployment rate forecasts.

Figure 4B:
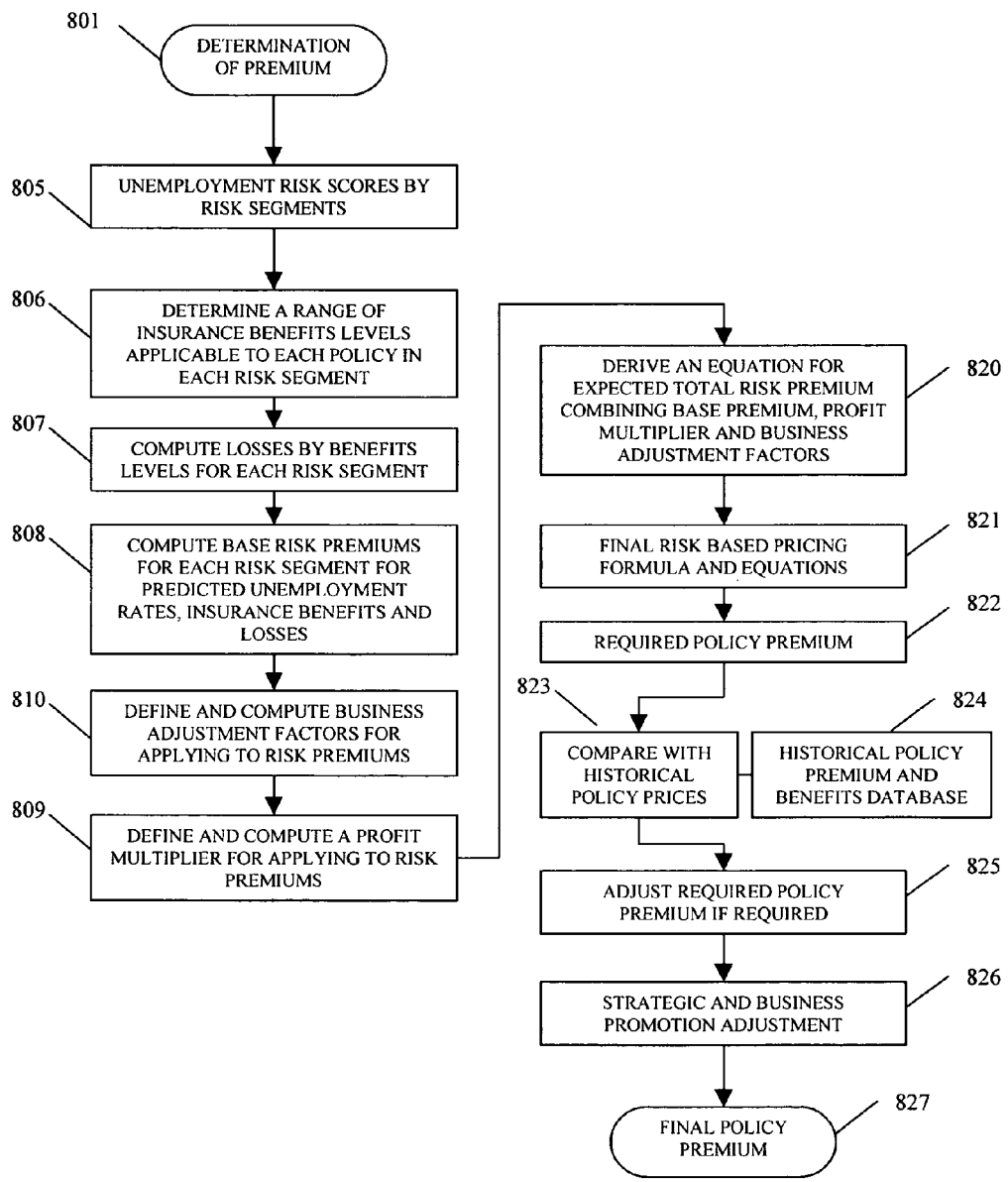

FIG. 4B shows a process for calculating unemployment insurance premiums based on unemployment risk scores 801. Other aspects of unemployment insurance premium pricing are based on insurance provider's historical policies data, number of policies offered and written, policy acceptance rates, policy duration, policy prices, policy costs, number of claims made and accepted, duration and amount of claims, payout ratio data, loss amount and rates, and fraud amount and rates for each defined category of employees.

In FIG. 4B, forecasted risk class unemployment rates 805 are used to compute risk class-specific policy loss rates 807 and base premium estimates 808 based on insurance policy benefits levels 806 according to common practices in the insurance industry. Once base premium estimates are computed 808, the premiums can be adjusted for desired profit margins 809 and other business conditions 810 to arrive at risk premium criteria 820, a risk premium formula 821 and a required policy premium amount 822. The required premium would then be compared with historical policy premiums 823 from a historical policy premium and benefits database 824, and the premium may be adjusted 825 if required. Further, the premium may be adjusted for strategic and special business promotions 826 to compute the final premium 827 for a given level of benefits.

FIG. 9 shows exemplary details of some risk class variables that may be used to define and constitute a set of a unique risk classes. For each one of these variables/classes, a unique unemployment forecast is calculated in a preferred embodiment of this invention. Again, these variables/classes are only exemplary, and alternative/additional classes could be used.

FIG. 11 shows an exemplary process for converting category variables' unemployment rates into risk factors. Here, unemployment rates for category variables are obtained from published sources, typically government sources, and are then divided by the national unemployment rate to calculate the risk factor for that variable. The simple underlying reason behind this method is to evaluate the risk level of a variable relative to the national unemployment rate.

For example, if the national unemployment rate is 6.0% and the New England region (which is a variable for the category labeled Region) has a rate of 4.5%, then the New England region unemployment risk factor is 0.75. For the Pacific region (which has unemployment rate of 6.2%), the risk factor would be 1.07 indicating that this region has a higher rate than the national unemployment rate and presents a relatively higher unemployment risk to its employees. This method of calculating risk factors demonstrates the concept of determining the relative risk of unemployment, and similar techniques can be applied to have the desired risk quantification within the scope of the present invention.

FIG. 12 shows an exemplary method for computing unique unemployment rates for each risk class. FIG. 12 shows examples of how risk variables from selected risk categories create unique risk classes and how they allow for the calculation of class-specific unemployment rates. As seen in FIG. 12, four risk categories (occupation, education, industry and region) were selected with six, four, thirteen and thirteen variables, respectively. This combination created 4,056 unique risk classes in which each risk class includes 35,750 employees.

In Class Example 1 at the bottom of FIG. 12, it can be seen that selecting and combining the category variables 'semi-skilled' for occupation, 'high-school' for education, 'construction' for industry and 'midwest' for region creates a unique risk class which has a class-specific unemployment rate of 8.80%, compared to the national unemployment rate of 6.0%. In Class Example 2, when the category variables selection is changed to create a new unique class consisting of 'managerial', 'college', 'financial' and 'northeast', essentially representing a risk-class of employees with these attributes, the unemployment rate computes to 5.30%. In Class Example 3 (FIG. 12) the unemployment rate for another risk class consisting of employees with attributes of farming, below high school, agriculture, and pacific computes to 11.10%. The third example would therefore represent the class with the highest likelihood of unemployment.

FIG. 13 shows another exemplary unemployment rate calculation using five risk categories instead of four as in FIG. 12. As seen in FIG. 13, five risk categories (occupation, education, industry, age and sex, and region) were selected with six, four, thirteen, four and thirteen variables, respectively. This combination created 16,224 unique risk classes in which each risk class includes 8,937 employees. It may be noted that these examples illustrate a preferred method of the present invention, but similar techniques may be used to compute risk classes and their respective unemployment rates within the spirit of this invention.

FIG. 14 depicts in detail how specific variables can be selected from each risk category and combined using a mathematical relationship with a national unemployment rate to yield a risk class-specific unemployment rate. Also seen in FIG. 12, unique risk class-specific unemployment rates can be computed for all risk classes depending on the number of risk categories and number of variables in each category. This method of calculating risk class-specific unemployment rates is for illustration and other techniques can be applied by persons skilled in the art to make a class specific unemployment rate determination. All such techniques would be deemed to have their source in, and be part of, the present invention.

One of the major challenges for an insurance company is to effectively mitigate adverse selection risk and moral hazard risk. For an insurance company to be viable, risk has to be appropriately pooled, and it is the sharing of risk between policyholders that provides the insurer the resources to manage losses, expenses, and profits. Adverse selection occurs due to asymmetric information—the people seeking insurance coverage know their situation better than the insurance company. When this happens, higher risk people get grouped with lower risk people which causes losses to increase, premiums to go up, and policyholder retention rates to decrease, resulting in a noncompetitive insurance business.

As seen in FIG. 5, the present invention preferably incorporates adverse selection risk mitigation methods 404 in its marketing, solicitation and application approval process. The marketing and sales department 402 of the private unemployment insurer 401 would undertake consumer and market research, forge partnerships and alliances, and promote business through various channels 408 (e.g., consisting of internet 409, telephone 410, direct mail and email 411, television and print advertising 412, partnership marketing programs 413, sales force and agents 414, and through special events 415) to target population segments 416 (e.g., consisting of employees 417, employers 418 and employees' families 419). Marketing research and analysis 402 would enable the insurer to identify, source and build base prospect lists and a customer database 403.

Adverse selection risk mitigation strategies' criteria 404 would be applied to the base prospect lists 403 developed by the marketing department, as well as to all applicants through risk based scoring, modeling and segmentation process. Adverse selection risk mitigation strategies would include development of a risk score 404 that indicates the probability of a prospect or an applicant being a higher unemployment insurance risk as compared to the general risk class to which he or she belongs. Applicants who have been unemployed previously or have not had a steady job or have a poor credit history or those who have changed their job function and industry or location more times than an average employee in the same class could potentially indicate a higher risk with respect to unemployment.

Based on an employee's data in the prospect database 403, or data obtained through an application, an internal adverse selection risk score 404 would be calculated for each prospect allowing for a determination whether the prospect qualifies for a solicitation effort. A few examples of variables for adverse selection mitigation risk scoring model could be, but are not limited to, a credit bureau score, employment status, eligibility for public/government unemployment compensation, unemployment compensation claim history, duration of employment in present job, and region of employment. In addition to developing an adverse selection risk score 404 or prospect score 405 for each prospect and an applicant, judgmental risk criteria could be applied to mitigate and manage adverse selection risk.

Upon scoring the base prospects lists for adverse selection risk 405, prospects would be segmented into categories 406 based on their prospect score determined eligibility for solicitation for primary or secondary private unemployment insurance. Such categorization 406 of final prospect lists would allow development of a contact database 407 that would house prospects in the form of, but not limited to, pre-evaluated lists, preferred contact lists, pre-qualified lists, and pre-approved lists. This segmentation of prospects would be invaluable not only in mitigating adverse selection risk but also in developing highly targeted, effective and efficient marketing programs for employee prospect segments through various channels 408 and target population segments 416.

Applications from employees 420 for unemployment insurance received in response to sales and marketing efforts, in addition to direct applications 422, would be evaluated 421 for all risk criteria, including re-scoring for adverse selection risk, and other policy requirements. Those applications that meet all application approval criteria 423 would be approved 424 while others will be denied 425. However, insurance coverage would only start upon employee's acceptance of the policy offer, and the receipt of all required fees and premiums, a signed contract and all required documents.

Overall, the adverse selection risk mitigation strategies (FIG. 5) would involve approving only qualifying prospects for solicitation, approving only qualifying applications for policy offers, and introducing an appropriate waiting period and/or deductibles, to mitigate the risk for approved applications. The waiting period would be the period in which a claim for unemployment insurance would receive no benefits, and only upon the satisfactory completion of the waiting period can the employee obtain the policy benefits. This solicitation and application approval methodology driven by adverse selection risk scoring process would help to minimize and mitigate adverse selection risk in any unemployment insurance method.

Another challenge for an insurance company is to effectively mitigate moral hazard risk which also occurs due to information asymmetry between the insured and the insurer. The present invention also preferably provides a mechanism for reducing moral hazard by properly estimating an applicant's unemployment risk, applying appropriate deductibles and waiting times or base periods during which a claim would not result in the payment of benefits, determining and managing an appropriate benefits level, and ensuring that claims are adequately scrutinized for accuracy and validity.

FIG. 6 illustrates an exemplary step-by-step approach to a moral hazard mitigation methodology which also includes the development of a moral hazard probability score and guidelines based on historical policy performance. Moral hazard risk strategies 501 would be formulated based on policy type and benefits and historical claims data 502. Depending on the predicted moral hazard risk score 502, an appropriate deductible amount 503 would be determined and a base waiting period 504 would be computed. The deductible amount would be the amount that would not be payable to the claimant which he or she would normally have been eligible for in the absence of a deductible clause. A waiting period would disallow payment of benefits for an initial period of time upon satisfactorily meeting all unemployment requirements.

Another element in the moral hazard risk mitigation process is the establishment of a cap on benefits payable under the unemployment insurance policy. Based on applicant's moral hazard risk score 502, a benefits cap 506 may be imposed that would limit the size of policy and benefits that the claimant could qualify. Other elements in the exemplary moral hazard risk mitigation process 501 include a claim validation process 516 and the enforcement of applicable deductibles and waiting periods 517.

As seen in FIG. 6, final policy terms and conditions 508 would be determined based on deductible amount 503, waiting period 504, and benefits cap 506 (generally, 507). After writing the policy, if a claim is filed 515, then the claim is verified in a claim validation process 516 based on a method selected from the group consisting of policy validity check 509, employee's proof of unemployment 510, base waiting period record 511, premium payment record 512, unemployment status verification from employer 513, and/or proof of government UI compensation 514.

In one preferred embodiment of the present invention, a standard waiting period of 30 days to 60 days would be applicable to all new policies. Some employees with higher than average adverse class selection risk scores may be offered a policy with higher than standard waiting period requirements, which could range from 30 to 90 days. However, applicants renewing their policies would be eligible to receive premium discounts and a waiver of the waiting period 505 depending on their claim history, payment record and risk attributes. Under normal circumstances, a policyholder with no claim in the first year and renewing the policy for another year without any gap would be eligible for a discount on policy premium and a waiver of the mandatory waiting period 505.

FIG. 7 shows a flow diagram for an exemplary benefits payment process 601 which ensures that all claims 602 are properly evaluated 603 for premium payment history and policy terms and conditions 605, policy applicability, employer records verification 606, data accuracy, claim validity, proof of unemployment, and government unemployment records. Benefits are then paid if the claim is valid 610 and rejected if the claims is invalid 609 (by process 604). Further, policy validity and terms and conditions are regularly monitored and the employment status of a claimant is frequently verified 611. Benefits are terminated 613, 615 if the claimant is no longer insured 614 or unemployed 612.

Figure 18:
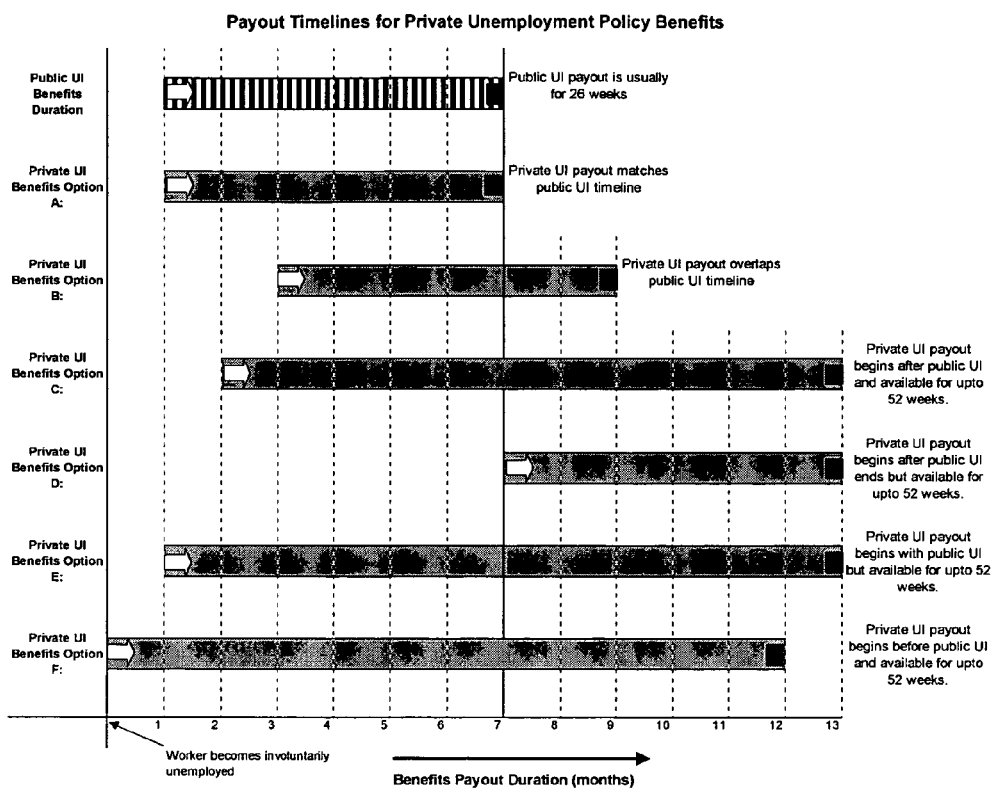
FIG. 18 illustrates flexible unemployment compensation payout timelines in an exemplary unemployment insurance structure.

FIG. 17, shows the results of an exemplary unemployment rate forecasting model used in this invention. FIG. 18 shows various examples of flexible unemployment compensation payout timelines that may be offered to employees thereby giving them a choice to select from one of the many insurance plans that best meets their requirements. As can be seen in FIG. 18, private UI option A payout matches public UI timeline, private UI option B payout overlaps (i.e. starts later and ends later) public UI timeline, private UI option C payout begins later and is available for up to 52 weeks as compared to public UI timeline, private UI option D payout begins after public UI ends and is available for up to 52 weeks, private UI option E payout begins with public UI and is available for up to 52 weeks, and private UI option F payout begins before public UI and is available for up to 52 weeks. FIG. 19 illustrates the concept of premium determination for a sample risk class. Each of these concepts was described in detail above.

As introduced above, FIG. 15 shows an exemplary product that may exist as part of the present invention. FIG. 15 shows unemployment risk scores for a particular risk class of employees where predicted unemployment rates range between 2.0% to 12.0%. As seen in this example, unemployment rates below 3.0% correspond to a maximum unemployment score of 900, and predicted unemployment rates of 9.0% and above correspond to a minimum unemployment risk score of 300. Here, lower unemployment rates translate to lower unemployment risks and, hence, higher unemployment scores.

Unemployment risk scores would allow employees to understand their present and future unemployment risks based on their current and future employment profiles. For example, employees can compare their present unemployment risk with a potentially new unemployment risk based on their present and future career plans allowing employees to make more educated decisions impacting their employment outlook.

In addition to unemployment risk scores, the present invention preferably provides systems and methods to quantify and predict employment security scores for assessing employees' employment security. Employment security scores allow employees to assess their probability of remaining voluntarily employed, or the chances of not becoming unemployed, in their present and future jobs. Such scores and ratings allow employees to assess factors affecting their job security and to compare job options based on their respective job security probabilities.

Unemployment risk scores, under normal assumptions, may also represent employment security scores. Both unemployment risk scores and employment security scores are developed using an unemployment rate forecast for each risk class of employees, and, in fact, a single score table can generally be used for both unemployment risk scores and employment security scores. Both scores, however, can be different if underlying risk variables are selected differently or if represented in different scales due to business considerations.

Using FIG. 15, it is shown that a hypothetical employee A might belong to a risk class where the unemployment risk score is 500. This would indicate that employee A has an unemployment risk score which is below the national average score of 600. This score would be useful to both businesses interested in working with employee A and to employee A himself or herself.

Score prediction tools for use with the present invention would preferably then allow employee A to build future employment scenarios (e.g., by changing job location, or industry, etc.) and to view his or her new score. For example, employee A may find that relocating to a new city might improve his unemployment score to 650 whereas a possible change to a desired industry may actually reduce the score to 450. Using unemployment score simulation tools of the present invention, employee A can change any of the risk variables used in the scoring model to evaluate his or her unemployment risk levels under various possible scenarios and use this knowledge to make more informed career and income-related decisions.

Another key aspect of this invention is the determination of employment value and employment scores. Employment value scores indicate the total income an employee is likely to earn in a given period adjusted for income growth and unemployment risk, under normal circumstances, should he/she choose to continue in his/her present job. Employment scores are preferably computed from unemployment risk scores, unemployment rates, current income, expected income growth, expected duration of employment, expected education level, expected job changes, current and future cost of living projections, job change history, and income history.

Employment value scores can be determined for short term employment and long term employment scenarios and/or for different types of hypothetical job scenarios. This can be highly valuable to employees who may use these scores to compare various job types and their short term and long term potential.

FIG. 8 shows an exemplary flow diagram for an employment value score determination process 901. In this embodiment, an employee's class specific unemployment risk score 902, employee's income level 903 and expected employment duration 904 (which consists of either a short term duration 905 or a long term duration 912) are preferably used along with expected income growth 906 to calculate total income potential 907, potential income loss due to unemployment 908, net income potential 909, employment value 910 and employment value scores 911. For long term employment value scores 915, the above process is repeated 913 using long term duration 912 to compute long term employment value 914. Each of these calculations may be made according to common practices.

FIG. 16 shows an example where short term and long term employment values and scores are computed for a risk class with a given employment profile and a scenario where employment characteristics are changed to modify the class employment profile. As seen in FIG. 16, the selected class's short term employment value score changes from 186 to 212 and its long term employment value score changes from 222 to 260 with changes in two of the five employment profile variables.

Unemployment scores and employment value scores (as described above) along with score simulators and calculators are useful to employees in understanding their present unemployment risk and employment value, and also in helping them to find the best employment options most suitable for them. In addition, businesses would greatly benefit from the use of these scores, or the scoring models, in their current form or through customization, as per their needs to better establish and manage their relationships with employees in relation to their present and future business.

Another key aspect of this invention is to provide employees with complete unemployment risk mitigation solutions, income loss protection solutions, and employment opportunity maximization solutions. Unemployment risk mitigation solutions would provide employees with high to average unemployment risk a bundle of products which would preferably consist of: unemployment risk score, unemployment report, unemployment outlook report consisting of scores for multiple job scenarios, employment value reports consisting of short term and long term employment value scores for multiple job scenarios, score simulation tools, unemployment insurance, and an employment situation monitoring product that would provide all of the above products to the employee regularly updated at a predetermined interval. For example, an employee who wishes to find a better opportunity to improve income and reduce unemployment risk may benefit from this solution by getting private unemployment insurance, monitoring the unemployment scores and employment value scores for jobs in his area for a period of six months to a year, and then selecting the best employment option.

Income loss solutions would be similar to unemployment mitigation solutions but would be customized for those employees who have an average to high unemployment risk. Opportunity maximization solutions would be similar to income loss solutions but they would be customized for employees with average to low unemployment risk. These solutions would allow most employees to make better career and income related decisions allowing them to maximize their career and income potential both in the short term and long term.

As briefly described above, FIG. 19 shows an exemplary premium calculation methodology where the final unemployment insurance policy premium is calculated. In this example, a policy premium is calculated for a risk class with an unemployment risk score of 550 for a policy type where benefits are paid at the rate of $1000 per month for a maximum unemployment duration of 6 months. As seen in FIG. 19, an adverse selection risk factor of 1.08, a business adjustment factor of 1.225, a profit multiplier of 1.08, a historical comparison adjustment factor of 0.95 and a promotional adjustment factor of 0.98 have been applied to determine a base policy premium of $35.10 and a final policy premium of $43.23 per month. Hence, FIG. 19 shows that employees belonging to this risk class and policy type would expect to pay a total of about $500 over 12 months and can expect an unemployment compensation of up to $6000 during the 12 month coverage period.

FIG. 20 details an exemplary calculation of monthly base unemployment insurance policy premiums for a range of compensation amounts and durations from which employees may select the combination that best meets their requirements. As seen in FIG. 20, if an employee wishes to receive unemployment compensation payments of $1000 per month for a duration of six months, payable in case of involuntary unemployment anytime during the policy coverage period of one year, then his or her base policy premium would be $30 per month. However, opting for a lower compensation amount of $750 per month for three months would reduce the base policy premium to just $11.25 per month.

As described above, the present invention provides methods for evaluating and predicting unemployment risk and methods and systems for providing unemployment insurance to employee employees which includes: the computation of unemployment risk scores by risk classes; risk-based premium calculation; adverse selection risk mitigation methods; moral hazard risk mitigation methods; and a benefits payment process.

This invention also provides employees with complete unemployment risk mitigation solutions, income loss protection solutions, and employment opportunity maximization solutions. Other aspects of providing unemployment insurance will follow general business guidelines and regulatory and market requirements (as known to those skilled in the art) and need not be set forth at length here.

It is also to be understood that this invention is not limited to using the data, records, data elements, variables and field structures described herein, and other data elements, data, and physical structures will be equivalent for the purposes of this invention. The invention has been described with reference to a preferred embodiment, along with several possible variations; however, it will be appreciated that a person of ordinary skill in the art can effect further variations and modifications without departing from the spirit and the scope of the invention.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A computer-implemented method for predicting and scoring an unemployment probability for an individual employee, comprising the steps of:

collecting by the computer, individual employee personal data related to said individual employee, said individual employee personal data including job tenure data, job classification data, and personal employment and unemployment data for the individual employee prior to a most recent employment for the individual employee, wherein said personal employment and unemployment data includes a personal unemployment rate based on occupation, education, industry, age, sex, and geographical region;

collecting by the computer, overall employment and unemployment data, wherein said overall employment and unemployment data includes a forecasted overall unemployment rate based on a historical relationship between an overall unemployment rate and economic variables;

calculating by the computer, an unemployment risk score for said individual employee, wherein the unemployment risk score is based upon the collected personal data related to the individual employee and the collected overall employment and unemployment data, wherein the unemployment risk score indicates the individual employee's risk of becoming unemployed in a given period, and wherein the unemployment risk score indicates a relationship between the individual employee's risk of becoming unemployed in a given period and the forecasted overall unemployment rate; and generating by the computer, an unemployment insurance premium for the individual employee based on the calculated unemployment risk score.

2. The method of claim 1, wherein said employee personal data comprises education, age, gender, job industry, salary, employment and unemployment history, geographical location, unemployment insurance claims and benefits history, income characteristics, and credit characteristics correlated, stored, updated and accessed through program product stored in the memory and databases of a general purpose computer.

3. The method of claim 2, wherein weighted risk reason codes are coupled with the personal data input in order to further evaluate individual responses.

4. The method of claim 1, wherein the step of computing an unemployment risk score further comprises the steps of:

segmenting a national workforce population into risk categories, each risk category comprising a plurality of individual risk subcategories;

assigning a risk factor weight relative to a forecasted national unemployment rate for each of said plurality of risk subcategories within each risk category; and determining the unemployment risk score for each of the plurality of individual risk subcategories.

5. The method of claim 4, wherein said unemployment risk categories comprise education, industry, age, gender, occupation, state, region, work experience, training level, work performance, job change frequency, industry change frequency, historical unemployment data, unemployment severity, job necessity, debt-to-income ratio, expenses-to-income ratio, and job confidence correlated, stored, updated and accessed through program product stored in the memory and databases of a general purpose computer.

6. The method of claim 4, further comprising the step of: computing an employment security score for the employee from said unemployment risk score.

7. The method of claim 4, further comprising the step of: computing a short term and a long term employment value based on data comprising unemployment risk scores, unemployment rates, current income, expected income growth, expected duration of employment, expected education level, expected job changes, current and future cost of living projections, job change history, and income history correlated, stored, updated and accessed through program product stored in the memory and databases of a general purpose computer.

8. The method of claim 4, wherein said forecasted national unemployment rates are generated based on data comprising consumer price index, producer price index, interest rates, trade balance, housing starts, industrial production, currency exchange rates, retail sales, personal income and credit, consumer expenditure, industry capacity utilization, government spending, capital spending, and consumer confidence correlated, stored, updated and accessed through program product stored in the memory and databases of a general purpose computer.

9. The method of claim 4, further comprising the step of: generating by the computer, a report having a plurality of different unemployment insurance options for said individual employee based on said calculated unemployment risk score and said assigned risk factor weights, wherein the unemployment options each include a policy type, coverage, the unemployment insurance premium, compensation amount, compensation payment duration, beginning of compensation payment period, ending of compensation payment period, and policy premium amount correlated, stored, updated and accessed through program product stored in the memory and databases of a general purpose computer.

10. The method of claim 1, wherein said personal and overall employment and unemployment data comprises employment and unemployment figures, involuntary unemployment figures, government unemployment insurance claims, government unemployment insurance claim acceptance rates, government unemployment insurance benefit payment rates and amounts, duration of government unemployment insurance claims, federal and state unemployment insurance fund data, and government insurance program policies and guidelines correlated, stored, updated and accessed through program product stored in the memory and databases of a general purpose computer.

11. A computer-implemented method of establishing a risk-based private unemployment insurance for an individual employee, comprising the steps of:

predicting by the computer, unemployment rates and computing unemployment risk scores for each of a plurality of homogeneous employment risk segments;

determining by the computer, a range of insurance benefits levels available for each of the plurality of employment risk segments;

calculating by the computer, a base risk-based premium price for each benefit level of each homogeneous employment risk segment; and offering by the computer, a plurality of unemployment insurance policy options to the individual employee based upon the risk segment to which the individual employee belongs to provide an individually tailored unemployment insurance policy option for the individual employee, wherein each unemployment risk score is based upon personal data related to individual employees of a corresponding homogenous segment and overall employment and unemployment data, wherein the unemployment risk score indicates the individual employees' risk of becoming unemployed in a given period, and wherein the unemployment risk score indicates a relationship between the individual employees' risk of becoming unemployed in a given period and a forecasted overall unemployment rate.

12. The method of claim 11, further comprising the steps of: issuing eligibility guidelines; and requiring that the employee meets the eligibility guidelines and by producing satisfactory proof of involuntary unemployment.

13. The method of claim 12, wherein satisfactory proof of the employee's involuntary unemployment is based on data comprising the employee's termination or involuntary unemployment documents from a verified source, employee's eligibility for government unemployment insurance, and government unemployment benefits payment records correlated, stored, updated and accessed through program product stored in the memory and databases of a general purpose computer.

14. The method of claim 11, wherein said determination of benefits is calculated based upon data comprising historical unemployment rates, forecasted unemployment rates, unemployment risk factors and unemployment risk scores correlated, stored, updated and accessed through program product stored in the memory and databases of a general purpose computer.

15. The method of claim 11, wherein the plurality of benefits include an employee selection of benefits options, said options comprising compensation amount, compensation payment duration, beginning of compensation payment periods, ending of compensation payment periods, and policy premium amount correlated, stored, updated and accessed through program product stored in the memory and databases of a general purpose computer.

16. The method of claim 11, wherein said unemployment insurance is offered as primary coverage to employees with no existing private unemployment insurance coverage.

17. The method of claim 11, wherein said unemployment insurance is offered as supplemental coverage to employees with existing private unemployment insurance coverage.

18. The method of claim 11, wherein said premium price is adjusted based on data comprising insurance provider's historical policies data, number of policies offered and written, policy acceptance rates, policy duration, policy prices, policy costs, number of claims made and accepted, duration and amount of claims, payout ratio data, and fraud amount and rates for each defined category of employees correlated, stored, updated and accessed through program product stored in the memory and databases of a general purpose computer.

19. The method of claim 11, wherein said base premium price is calculated based on data comprising adverse selection risk, prospects, moral hazard risk, business risks, promotion pricing, strategic significance, and business costs correlated, stored, updated and accessed through program product stored in the memory and databases of a general purpose computer.

20. The method of claim 11, wherein the amount of said benefits is adjusted based on data comprising employee's satisfactory premium payments, policy record, policy validity, deductible payment, and completion of a defined base period, or a waiting period, which is a predetermined duration after the employee is accepted and enrolled into the unemployment insurance program correlated, stored, updated and accessed through program product stored in the memory and databases of a general purpose computer.

21. The method of claim 11, further comprising the step of: establishing by the computer, an unemployment risk score, employment security score, short term and long term employment value, employee application for unemployment insurance, risk-based pricing determination, risk classes determination process, approval process, unemployment risk determination process, coverage and premium determination process, claim processing and validation, benefits administration process, periodic review of unemployment status and benefits duration determination process, coverage expiry determination process, policy renewal process, discount and credit evaluation and renewal application process, records storage process, records update process, algorithm update process, historical and forecast trends update process, risk score adjustments process, risk categories update process, benefits and terms and conditions update process, and organizational structuring process, to provide individualized unemployment insurance options directly to the individual employee correlated, stored, updated and accessed through program product stored in the memory and databases of a general purpose computer.

22. A computer-implemented method of providing unemployment risk mitigation solutions, income loss protection solutions, and employment opportunity maximization solutions for employees, the method comprising:

scoring by the computer, unemployment risk, employment security, and short term and long term employment value, and calculating unemployment risk scores, employment security scores, and employment value scores for employees based on employees' personal data, macroeconomic data and national unemployment data, said individual employee personal data including job tenure data, job classification data, and employment and unemployment data for the individual employee prior to a most recent employment for the individual employee, wherein said employment and unemployment data includes an unemployment rate based on occupation, education, industry, age, sex, and geographical region;

establishing by the computer, a risk-based unemployment insurance pricing and premium calculation;

determining by the computer, a multitude of insurance policy types for different applicant risk classes and unemployment risk scores, to provide a choice in terms of policy benefits for varying levels of premium amounts;

determining by the computer, a primary unemployment insurance policy and a supplementary unemployment insurance policy;

determining at the computer, unemployment policy premiums and benefits for the primary and secondary unemployment insurance policies based on employee personal data, employment history, employer data, credit data and/or national employment data;

computing at the computer, unemployment policy premiums and benefits based on one or more of the employees' current and past unemployment rates, government unemployment insurance claims, claim acceptance rates, government insurance benefits payments rates and amounts, duration of new government unemployment insurance claims and continued claims, employers contribution to payroll taxes, federal and state unemployment insurance fund data, fraud data pertaining to government unemployment insurance program, and government insurance program's policies and guidelines;

determining at the computer, an unemployment policy premium, terms and conditions for each of the primary and secondary unemployment insurance policies based on data related to employer's historical employment rate, weekly and yearly wages, applicable Standard Industry Classification (SIC) codes, other industry classifications, unemployment rates, payroll taxes, future changes in recruitment, future layoffs, company outlook, and/or industry outlook; and managing, administering and coordinating by the computer, an insurance program such that employees would be able to choose from the primary and secondary unemployment insurance policies with various levels of benefits, payment durations and duration types, wherein each unemployment risk score is based upon personal data related to an individual employee and overall employment and unemployment data, wherein the unemployment risk score indicates the individual employee's risk of becoming unemployed in a given period, and wherein the unemployment risk score indicates a relationship between the individual employee's risk of becoming unemployed in a given period and a forecasted overall unemployment rate.

23. A computer system for generating an unemployment risk score for an individual employee, the system comprising:

a storage device having personal data related to said individual employee and overall employment and unemployment data stored thereon, said personal data including job tenure data, job classification data, and personal employment and unemployment data for the individual employee prior to a most recent employment for the individual employee, wherein said personal employment and unemployment data includes a personal unemployment rate based on occupation, education, industry, age, sex, and geographical region, and wherein said overall employment and unemployment data includes a forecasted overall unemployment rate based on a historical relationship between an overall unemployment rate and economic variables; and, a computer for calculating an unemployment risk score for said individual employee, wherein the unemployment risk score is based upon the personal data related to the individual employee and the overall employment and unemployment data stored in said storage device, wherein the unemployment risk score indicates the individual employee's risk of becoming unemployed in a given period, and wherein the unemployment risk score indicates a relationship between the individual employee's risk of becoming unemployed in a given period and the forecasted overall unemployment rate, said computer capable of generating an unemployment insurance premium for the individual employee based on the calculated unemployment risk score.

* * * * *